United States Patent [19]
Reneris

[11] Patent Number: 5,903,894
[45] Date of Patent: May 11, 1999

[54] SYSTEM AND METHOD FOR USING A HIERARCHICAL DATA STRUCTURE TO CONTROL AND IDENTIFY DEVICES AND REPRESENT CONNECTIONS BETWEEN THE DEVICES

[75] Inventor: Kenneth S. Reneris, Redmond, Wash.

[73] Assignee: Microsoft Corporation, Redmond, Wash.

[21] Appl. No.: 08/810,019

[22] Filed: Mar. 3, 1997

[51] Int. Cl.[6] .................................................. G06F 17/30
[52] U.S. Cl. ...................... 707/100; 707/103; 395/284; 395/828
[58] Field of Search .................................... 707/103, 100, 707/102; 395/828, 284, 200.54, 200.56

[56] References Cited

U.S. PATENT DOCUMENTS

| | | | |
|---|---|---|---|
| 5,414,812 | 5/1995 | Filip et al. | 395/200 |
| 5,504,892 | 4/1996 | Atsatt et al. | 395/600 |
| 5,504,921 | 4/1996 | Dev et al. | 395/800 |
| 5,548,726 | 8/1996 | Pettus | 395/200.09 |
| 5,550,980 | 8/1996 | Pascussi et al. | 395/200.05 |
| 5,598,566 | 1/1997 | Pascussi et al. | 395/700 |
| 5,604,892 | 2/1997 | Nuttal et al. | 395/500 |
| 5,615,363 | 3/1997 | Jenness | 395/614 |
| 5,748,980 | 5/1998 | Lipe et al. | 395/828 |
| 5,787,246 | 7/1998 | Lichtman et al. | 395/200.5 |
| 5,809,235 | 9/1998 | Sharma et al. | 395/200.6 |
| 5,809,329 | 9/1998 | Lichtman et al. | 395/828 |
| 5,819,107 | 10/1998 | Lichtman et al. | 395/828 |

Primary Examiner—Paul V. Kulik
Assistant Examiner—Michael J. Wallace, Jr.
Attorney, Agent, or Firm—Jones & Askew, LLP

[57] ABSTRACT

A hierarchical data structure is created in dynamic memory that is dynamically expanded or modified during run-time operations of the computer system. Information about the devices is loaded from a definition block into the hierarchical data structure. The information is a byte stream of data that is translated and stored as hierarchical information, such as device objects, data objects, and control method objects. These objects are hierarchically nested within the hierarchical data structure. A device object identifies a corresponding device in the computer system. The hierarchy formed between device objects represents the hierarchical I/O connections within the computer system. A data object identifies configuration and hardware dependency information associated with a corresponding device. A control method object is an executable reference for controlling a corresponding device. The control method object is a sequence of pseudocode instructions interpreted by the operating system providing an abstract, extensible, and portable mechanism for precise control of a device without calling routines from the BIOS.

The hierarchical data structure is preferably used by the operating system as a communication tool and reference to identify devices, to identify configuration and power management information about devices, to provide an executable control mechanism that is abstract and extensible to control devices, and to extensibly add functionality to a device.

44 Claims, 15 Drawing Sheets

SYSTEM AND METHOD FOR USING A HIERARCHICAL DATA STRUCTURE TO CONTROL AND IDENTIFY DEVICES AND REPRESENT CONNECTIONS BETWEEN THE DEVICES

TECHNICAL FIELD

This invention relates to describing and controlling computer hardware devices by software modules, such as an operating system, and is more particularly related to a system and method for using a hierarchical data structure to control and identify controllable computer hardware devices and represent physical input/output connections between the devices.

BACKGROUND OF THE INVENTION

Traditional computer systems have been designed using a single-layered, non-hierarchical hardware device paradigm. Essentially, controllable hardware devices were connected directly to the micro processor and the characteristics of these hardware devices had to be described to the operating system.

In prior attempts to define and describe hardware devices to the operating system (such as Plug-n-Play (PnP) BIOS and Advanced Power Management (APM) BIOS), the hardware definitions have been in the form of a flat-file reference. For example, PnP BIOS provides a flat-file (non-hierarchical) listing of the hardware devices for a computer system without describing the device relationships (e.g., physical & logical connections) and hardware dependency relationships (e.g., power requirements).

However, other computer hardware architectures are designed using a hierarchical hardware device paradigm. These hierarchical computer hardware device designs cannot be adequately described using non-hierarchical descriptions. An example of such an advanced hierarchical computer hardware architecture would include a high speed memory bus, with a high speed Peripheral Component Interconnect (PCI) bus attached to the memory bus, and with a lower speed Industry Standard Architecture (ISA) bus attached to the PCI bus. This nested or hierarchical computer architecture approach gives better system performance when high speed data transactions are required.

Hierarchical computer hardware designs have also been implemented in laptop computers that pose special problems of defining hardware devices. For example, when a laptop computer is inserted or "docked" into a desktop docking station, the configuration of the computer changes and new hardware devices are available to the computer. Under PnP BIOS, the computer must fully redetect all of the devices of the computer system because there is no representation of which specific devices are affected by configuration changes. Due to the non-hierarchical description of hardware devices, PnP BIOS must assume all devices are either new devices or old devices. Additionally, PnP BIOS has problems determining specific configuration changes when devices are "layered" or nested, e.g., one device plugs into a socket on another device, etc. This same type of problem also occurs when a laptop is "undocked" from the docking station.

In the APM BIOS, a different kind of flat-file listing of hardware devices in the computer system is used. Here, the flat-file listing uses a numbering system for identifying devices rather than device id's used by PnP BIOS. The numbering system used by APM BIOS also has a "name resolution" problem when changes to the hardware configuration occur. The operating system cannot resolve the problem of which specific hardware device has changed when hardware devices are referenced merely by a number and described in a non-hierarchical way. Furthermore, it would be advantageous to unify how the hardware configuration is identified via a common interface while solving this name resolution problem.

Therefore, there is a need for a method for (1) describing the hardware devices to the operating system, (2) describing connections or dependencies between the devices, and (3) provide extensible and abstract methods of controlling the devices executable by the operating system or any other software module, such as the BIOS routines.

SUMMARY OF THE PRESENT INVENTION

The present invention satisfies the above-described needs by providing a system and method for using a hierarchical data structure to control and identify hardware devices in a computer system and represent connections between the devices. In one aspect of the present invention, a first object, preferably an abstract and extensible first device object that advantageously identifies a first device, is stored within the hierarchical data structure. A second object, preferably an abstract and extensible second device object that advantageously identifies a second device, is also stored within the hierarchical data structure. The second object is positioned immediately below the first object to form a hierarchy between the first object and the second object.

This is advantageous because the hierarchy accurately represents the physical input/output connection between the first device and second device. By accurately representing such connections, the hierarchical data structure provides a useful reference used by the operating system or BIOS to determine which of a group of similar devices existing at different locations within the computer system have changed configuration, must be controlled, or are affected by hardware events in the computer system.

Additionally, a data object associated with the first device is stored within the hierarchical data structure immediately below the first object. The data object is preferably an abstract, extensible data object that advantageously contains and identifies configuration and hardware dependent relationship information about the first device. Similarly, an additional data object associated with the second device is stored within the hierarchical data structure immediately below the second object. The additional data object is an abstract, extensible object that advantageously contains and identifies configuration information about the second device. The additional data object may also inherit information about the second device from its parent (the data object associated with the first device).

Additionally, a control method object, preferably an abstract and extensible control method object associated with the first device, is also stored within the hierarchical data structure immediately below the first object. This is advantageous because the control method object provides an abstract and executable reference that associates a specific control action with the first device. The control method object preferably contains an executable control method or a sequence of pseudocode instructions, which can include references to other objects. Similarly, an additional control method object, preferably an abstract and extensible additional control method object associated with the second device, is stored within the hierarchical data structure immediately below the second object. This is advantageous because the additional control method object provides an executable reference that associates a specific control action with the second device. In other words, the control method object and the additional control method object are portable language constructs (pseudocode instructions) used to advantageously control specific devices in a specific manner without calling a BIOS routine.

In another aspect of the present invention, a system is provided for dynamically expanding the hierarchical data structure having hierarchically related objects in memory. The system has a processor, a group of controllable devices coupled to the processor, and a memory storage device coupled to the processor. In this system, the processor is operative to sense a hardware event in a changed device (one of the controllable devices), to interrogate the changed device, and to sense an underlying device (another of the controllable devices) connected to the changed device. The processor is also operative to search the hierarchical data structure for one of the hierarchically related objects that identifies the underlying device, to obtain hierarchical information (preferably contained in other hierarchically related objects) about the underlying device if the processor locates or fails to locate an object identifying the underlying device, and to store hierarchical information about the underlying device at an insert location within the hierarchical data structure. The insert location can be referenced relative to an existing hierarchically related object or referenced absolutely from a root level within the hierarchical data structure. In this manner, the hierarchical data structure can be advantageously expanded during run-time operation of the computer system to reflect the current configuration of the computer system.

In another aspect of the present invention, a system is provided for dynamically modifying a hierarchical data structure having hierarchically related objects in memory. The system has a processor, a group of controllable devices coupled to the processor, and a memory storage device coupled to the processor. In this system, the processor is operative to sense a request to remove one of the devices, to determine which other devices are affected if the requested device is removed, and to set status attributes of the hierarchically related objects associated with the requested device and the affected devices from within the hierarchical data structure to indicate devices are not present. In this manner, the hierarchical data structure can be advantageously modified during run-time operation of the computer system to reflect the current configuration of the computer system. Alternatively, the hierarchically related objects associated with the requested device and the affected device can be removed from within the hierarchical data structure as opposed to setting any status attributes.

The processor is further operative to search dependency information corresponding to each of the devices identified within the hierarchical data structure and to identify which of the controllable devices depend upon the requested device, the identified devices being the affected devices.

In another aspect of the present invention, a computer-readable medium is described on which is stored a computer program for controlling a device within a computer system using a hierarchical data structure. The computer program instructions, when executed, request control of the device in a desired manner and identify a first control method (a sequence of the one or more pseudocode instructions) within the hierarchical data structure corresponding to the desired manner. The program instructions further execute the first control method by sequentially calling each of the one or more pseudocode instructions and access a representation of a controllable element of the device to advantageously provide control of the device without having to know a hardware implementation of the device. The representation of the controllable element is preferably an operational region. Thus, this aspect of the present invention advantageously provides an extensible and abstract method of controlling the devices executable by the operating system itself.

In another aspect of the present invention, a system is provided for using a hierarchical data structure to provide additional functionality of a controllable device in the computer system. The system has a processor, the controllable device coupled to the processor, and a memory storage device coupled to the processor. In this system, the processor is operative to identify the controllable device by reading the hierarchical data structure containing a device object corresponding to the device, to load a device driver into memory from the memory storage device for supporting the device object, to determine if the controllable device supports additional functionality beyond the functionality supported by the device driver (preferably by searching the hierarchical data structure for a data object or control method object associated with the device), and to create a new device object if the controllable device supports additional functionality. In this manner, the new device object, in response to a call to the device driver, advantageously intercepts the call and references the hierarchical data structure to provide the additional functionality for the controllable device.

In another aspect of the present invention, a method is described for using a hierarchical data structure to power down one of the controllable devices within a computer system having a plurality of power resources. In the method, one of the controllable devices is selected to be powered down. The power resources that must be on to support the selected device when powered down are identified by reading one of the hierarchically related objects within the hierarchical data structure below a device object within the hierarchical data structure. The device object is one of the hierarchically related objects and is associated with the selected controllable device. Next, all of the power resources that are not identified power resources are turned off. This is preferably accomplished by executing a control method contained in a control method object for each of the power resources that is not one of the identified power resources. The control method object provides an executable mechanism for controlling one of the power resources. Finally, all of the identified power resources are turned on. This is preferably accomplished by executing a control method contained in a control method object for each of the identified power resources.

Additionally, the computer system can be powered down using the hierarchical data structure by the following additional steps. A sleeping system power state is selected prior to performing the above mentioned steps for powering down a device. Once the sleeping system power state has been selected, the above mentioned steps for powering down a device are repeated for each of the devices in the computer system. Next, the power resources that must be off to support the selected system state are identified by reading the hierarchical data structure. Finally, the identified power resources are turned off, preferably by executing a control method associated with each of the identified power resources. In this manner, each device as well as the entire system can be advantageously powered down to manage the power consumption of the computer system using the hierarchical data structure.

In yet another aspect of the present invention, a method is described for using a hierarchical data structure to turn on one of the controllable devices within a computer system having a plurality of power resources. In the method, one of the controllable devices is selected to be turned on. The power resources that must be on to support the selected device are identified by reading one of the hierarchically related objects within the hierarchical data structure below a device object within the hierarchical data structure. The device object is one of the hierarchically related objects and is associated with the selected device. Next, all of the power resources that are identified power resources are turned on. This is preferably accomplished by executing a control method contained in a control method object for each of the power resources that is one of the identified power resources. The control method object provides an executable mechanism for controlling one of the power resources.

Additionally, the computer system can be placed in an operating state from a sleeping state using the hierarchical data structure by the prompting the computer system to turn on, restarting a processing unit within the computer system, and jumping to a restart vector in memory prior to the above-mentioned steps for turning on one of the devices. Next, the above mentioned steps for turning on a device are repeated for each of the devices in the computer system. In this manner, each device as well as the entire system can be advantageously turned on to further manage the power consumption of the computer system using the hierarchical data structure.

The above-described advantages and other advantages of the present invention will be appreciated from studying the following detailed description and drawings, and the appended claims.

DETAILED DESCRIPTION

Figure 1:
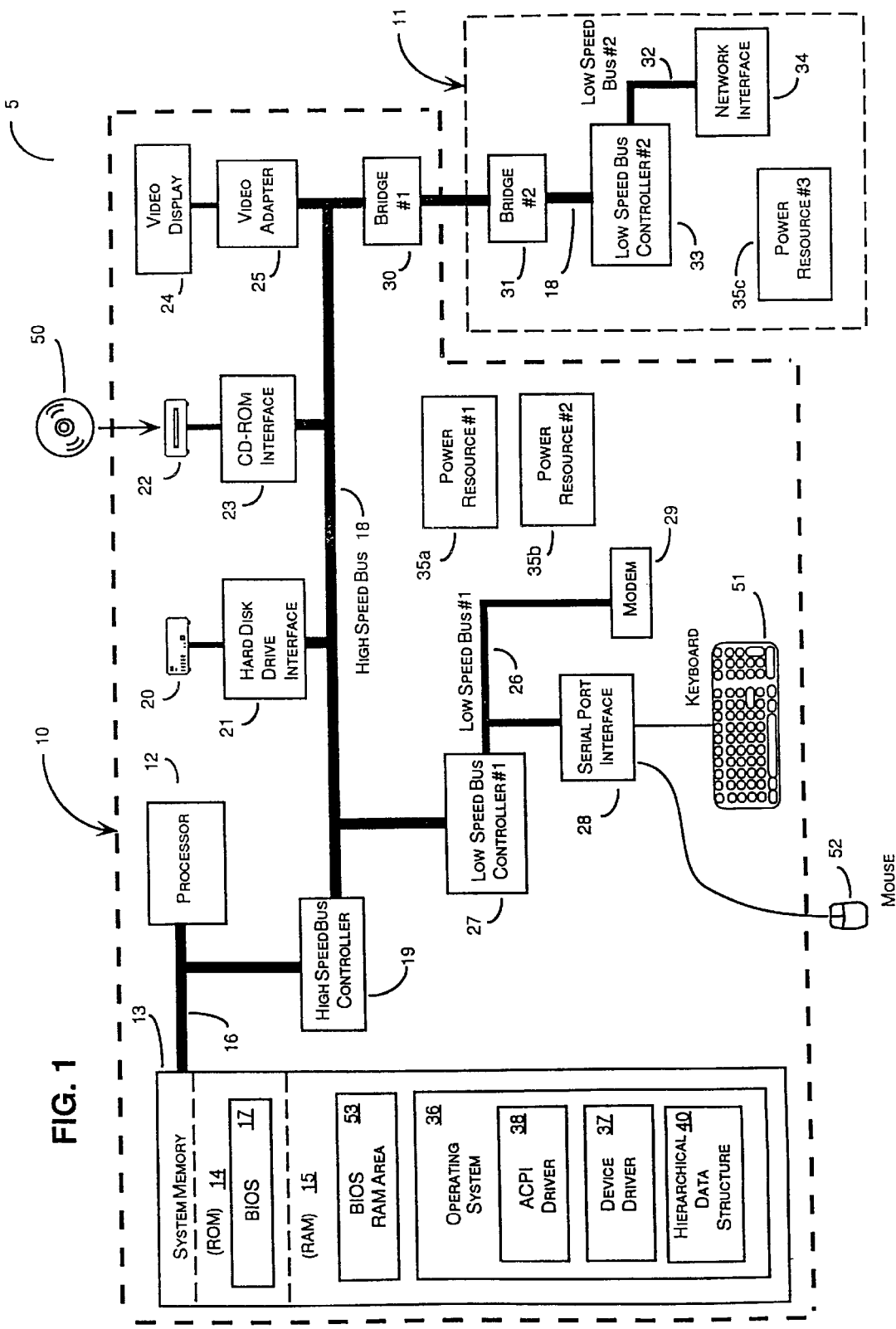
FIG. 1 is a block diagram of a computer system representing the operating environment of an embodiment of the present invention.

The present invention is directed to a system for controlling and identifying controllable hardware devices (devices) within a computer system and connections between the devices using a hierarchical data structure (HDS). Basically, the HDS stores information about the computer system and the devices within the computer and is used as a reference by software modules, such as an operating system. The HDS is preferably used by the operating system to identify devices, describe the dependencies of the devices (such as power requirements and physical input/output connections), control the devices, enhance the functionality of the devices, and discover information (data) about the device. Precise and low-level control of each device is preferably implemented by executable control methods embodied within the HDS. The HDS is very robust in that it can be dynamically expanded or modified in response to run-time configuration changes within the computer system, such as docking or ejection of a portable computer with a docking station. Another important use of the HDS is when the operating system is managing power consumed by each device and the system as a whole.

The preferred embodiment of the present invention uses a modified version of the "WINDOWS NT" operating system or the "WINDOWS 95" operating system, developed and marketed by Microsoft Corporation of Redmond, Wash. Although the preferred embodiment will be generally described in the context of controllable hardware devices and an operating system running on a personal computer, those skilled in the art will recognize that the present invention also can be implemented in conjunction with other program modules for other types of computers.

The detailed description which follows is represented largely in terms of processes and symbolic representations of operations by conventional computer controlled hardware devices. A "controlled hardware device" or device is a term used to refer to any computer subsystem or peripheral that may be connected to a computer and controlled by its processing unit. Examples of such devices include, but are not limited to, memory storage devices, connected video display devices, network interfaces, modems, and input devices. The processes and operations performed by the computer include the manipulation of signals by a processing unit and the maintenance of these signals within data structures resident in one or more memory storage devices. A "data structure" is defined as imposing a physical organization upon a collection of data stored within a memory storage device and represents specific electrical or magnetic elements. In the one embodiment of the present invention, the "hierarchical data structure" or HDS is created and used having data or objects encapsulating data organized into nodes of a hierarchy. The organization of the HDS imposes a physical structure upon the data encapsulated within the objects. Symbolic representations of such data structures are the means used by those skilled in the art of computer programming and computer engineering to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, information, elements, symbols, characters, numbers, records, blocks, entries, objects, files, data structures, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as adding, comparing, reading, searching, locating, identifying, displaying, altering, etc. which are often associated with manual operations performed by a human operator. The operations described herein are machine operations performed in conjunction with various input provided by a human operator or user that interacts with the computer.

In addition, it should be understood that the operating system, drivers, programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

THE OPERATING ENVIRONMENT

FIG. 1 illustrates various aspects of the preferred computing environment in which an illustrative embodiment of the present invention is designed to operate. Those skilled in the art will immediately appreciate that FIG. 1 and the associated discussion are intended to provide a brief, general description of the preferred computer hardware and software modules, and that additional information is readily available in the appropriate programming manuals, user's guides, and similar publications.

FIG. 1 illustrates a computer system 5, comprising a portable personal computer 10 and a docking station 11, designed under the hierarchical device paradigm and is suitable for supporting the operation of an embodiment of the present invention. As shown in FIG. 1, the personal computer 10 includes a processor 12, preferably the "PENTIUM" family of microprocessors manufactured by the Intel Corporation of Santa Clara, Calif. However, it should be understood that the invention can be implemented on computers based upon other microprocessors, such as the "MIPS" family of microprocessors from the Silicon Graphics Corporation, the "POWERPC" family of microprocessors from both the Motorola Corporation and the IBM Corporation, the "PRECISION ARCHITECTURE" family of microprocessors from the Hewlett-Packard Company, the "SPARC" family of microprocessors from the Sun Microsystems Corporation, or the "ALPHA" family of microprocessors from the Digital Equipment Corporation.

The personal computer 10 also includes system memory 13 (including read only memory (ROM) 14 and random access memory (RAM) 15), which is connected to the processor 12 by a processor data/address bus 16. The BIOS 17 for the personal computer 10 is stored in ROM 14 and is loaded into a BIOS area 53 of RAM 15 upon booting. Those skilled in the art will recognize that the BIOS 17 is a set of basic executable routines that have conventionally helped to transfer information between elements within the personal computer 10.

Within the personal computer 10, a high speed bus 18 is connected to a high speed bus controller 19 and the processor data/address bus 16. In one embodiment, the high speed bus 18 is implemented as a standard Peripheral Component Interconnect (PCI) bus although other standardized bus architectures may be used, such as the Extended Industry Standard Architecture (EISA) bus. The high speed bus controller 19 examines all signals from the processor 12 to route the signals to the appropriate bus. Signals between the processor 12 and the system memory 13 are merely passed through the high speed bus controller 19. However, signals from the processor 12 intended for devices other than system memory 13 are routed onto the high speed bus 18, another level in the hierarchical design of the computer system 5.

Various devices are connected to the high speed bus 18. A hard disk drive 20 is connected to the high speed bus 18 via a hard disk drive interface 21. A CD-ROM drive 22, which is used to read a CD-ROM disk 50, is connected to the high speed bus 18 via a CD-ROM interface 23. The video display 24 or other kind of display device is connected to the high speed bus 18 via a video adapter 25.

A first low speed bus 26 is connected to the high speed bus 18 by a first low speed bus controller 27. The first low speed bus 26 is generally of less or equal speed when compared to that of the high speed bus 18. In the one embodiment, the first low speed bus 26 is implemented as an Industry Standard Architecture (ISA) bus although other standardized bus architectures may be used.

A user enters commands and information into the personal computer 10 by using a keyboard 51 and/or pointing device, such as a mouse 52, which are connected to the first low speed bus 26 via a serial port interface 28. Other types of pointing devices (not shown in FIG. 1) include track pads, track balls, joy sticks, data gloves, head trackers, and other devices suitable for positioning a cursor on the video display 24.

As shown in FIG. 1, the personal computer 10 also includes a modem 29. The modem 29 is preferably internal to the personal computer 10 and is connected directly to the first low speed bus 26. Although illustrated in FIG. 1 as internal to the personal computer 10, those of ordinary skill in the art will quickly recognize that the modem 29 may also be external to the personal computer 10. The modem 29 is typically used to communicate over wide area networks (not shown), such as the global Internet.

As shown in FIG. 1, a first bridge 30 is connected to the high speed bus 18. The first bridge 30 connects to a second bridge 31, which is part of the docking station 11, when the user "docks" the personal computer 10 into the docking station 11. In this manner, devices in the docking station 11 become part of the personal computer 10 and capable of being controlled by the processing unit 12.

Within the docking station 11, a second low speed bus 32 is connected to the high speed bus 18 by a second low speed bus controller 33. Similar to the first low speed bus 26, the second low speed bus is generally of less or equal speed when compared to that of the high speed bus 18. In one embodiment the second low speed bus 26 is preferably implemented as an ISA bus although other standardized bus architectures may be used. A network interface 34 is connected to the second low speed bus 32 in the docking station 11. The network interface 34 is used for connecting to other computers via local area networks (not shown). Those skilled in the art will appreciate that other buses (not shown) may be present in the docking station 11 and that the network interface 34 may be capable of communicating with the processor 12 over a higher speed bus (such as a PCI bus) rather than the second low speed bus 32. However, the illustrated buses (the high speed bus 18 and the second low speed bus 32) are used to support embodiments of the present invention.

Devices 19–34 in the personal computer 10 and in the docking station 11 are supported by controllable power resources 35a–c. Each power resource 35a–c is basically a shared supply or resource within a computer system 5, such as a shared power "plane", a shared isolation buffer, or a shared clock supply. Generally, the power resources of the computer system are shared amongst each device within the computer system. This allows for an economical means for routing energy only where it is needed and for controlling power consumption. For example, power resource #1 34a is a high current shared power plane capable of providing power to a large number of devices in the computer system, while power resource #2 35b and power resource #3 35c are low current shared power planes capable of only providing power to a small number of devices in the computer system 5.

Although other devices within the personal computer 10 and the docking station 11 are not shown, those of ordinary skill in the art will appreciate that such devices and the interconnection between them are well known. Furthermore, those of ordinary skill in the art will appreciate that the above-mentioned devices 19–34 are illustrative for describing a hierarchically designed personal computer 10 and could include other devices, such as a floppy disk drive (not shown). Accordingly, additional details concerning the internal construction of the personal computer 10 and the docking station 11 need not be disclosed in connection with the present invention.

Those skilled in the art will understand that software modules and data are provided to the personal computer 10 via one of the memory storage devices or computer-readable media, which may include the hard disk drive 20, floppy disk (not shown), CD-ROM 50, RAM 15, ROM 14, and digital tapes (not shown). In the preferred embodiment, these software modules include an operating system 36 and device drivers 37 (software components that provide the processor 12 a way to communicate with devices connected to the personal computer 10). The operating system 36 includes an Advanced Configuration and Power Interface (ACPI) driver 38, which is a software module that implements configuration and power management aspects of the operating system 36. In the preferred embodiment, the hard disk drive 20 may be used to store these software modules once they are installed from a CD-ROM 26. A hierarchical data structure (HDS) 40 is another software module preferably created in RAM 15 when the computer system 5 boots up and is preferably maintained in system memory 13. The HDS 40 is discussed in greater detail below with regards to FIGS. 2–14.

A Basic Input/Output System (BIOS) 17 is stored in the ROM 14 (which is later loaded into a BIOS area 53 of RAM 15) and provides low-level service routines executable by the operating system 36 or other software modules. Conventionally, the BIOS 17 has provided these service routines to give access to the devices within the computer system. As configuration and power management has evolved and become more complex, the amount of information and tasks imposed upon traditional ROM-based BIOS 17 has vastly increased. In the preferred embodiment of the present invention, the BIOS 17 has been simplified because the operating system 36 manages the dynamic configuration of the computer system, unifies the power management process, and executes pseudocode control methods to interact with the devices on a low-level. How the BIOS 17 is used when the personal computer 10 is turned on or reset is described in detail later with regards to FIGS. 3A–3B.

In general, the operating system 36 interprets and carries out instructions issued by the user. For example, when the user wants to load a software module (such as one of the device drivers 37), the operating system 36 interprets the instruction and causes the processor 12 to load the software module code into RAM 15 from either the hard disk drive 20 or the CD-ROM 50. Once the software module is loaded into the RAM 15, it can be used by the processor 12. In case of large software modules, the processor 12 loads various portions of program modules into RAM 15 as needed.

As previously mentioned, the preferred embodiment of the present invention is the operating system 36 that uses the HDS 40 in RAM 15. The HDS 40 is a file used by the operating system 36 to identify devices, to describe the dependencies of the devices (such as power requirements and physical input/output connections), and to enhance the functionality of the devices. The HDS 40 is preferably used by a modified version of the "WINDOWS NT" operating system or the "WINDOWS 95" operating system, both of which adhere to an Advanced Configuration and Power Interface (ACPI) Specification. However, it should be understood that the invention can be implemented for use with other operating systems that do not adhere to the ACPI Specification including, but not limited to, UNIX operating systems, Microsoft Corporation's "WINDOWS 3.1", IBM Corporation's "OS/2" operating system, and the operating system used in "MACINTOSH" computers manufactured by Apple Computer, Inc.

It should be appreciated that operating systems, such as the "WINDOWS NT" operating system or the "WINDOWS 95" operating system, are quite complex and provide a wide variety of services that allow users and programs to utilize the resources available in the personal computer. Those skilled in the art will be familiar with operating systems and their various features.

Likewise, those skilled in the art will appreciate that the HDS 40 provides a wide variety of other features and functions in addition to those included in the brief description presented above.

CREATING THE HDS IN MEMORY WHEN BOOTING

Figure 2:
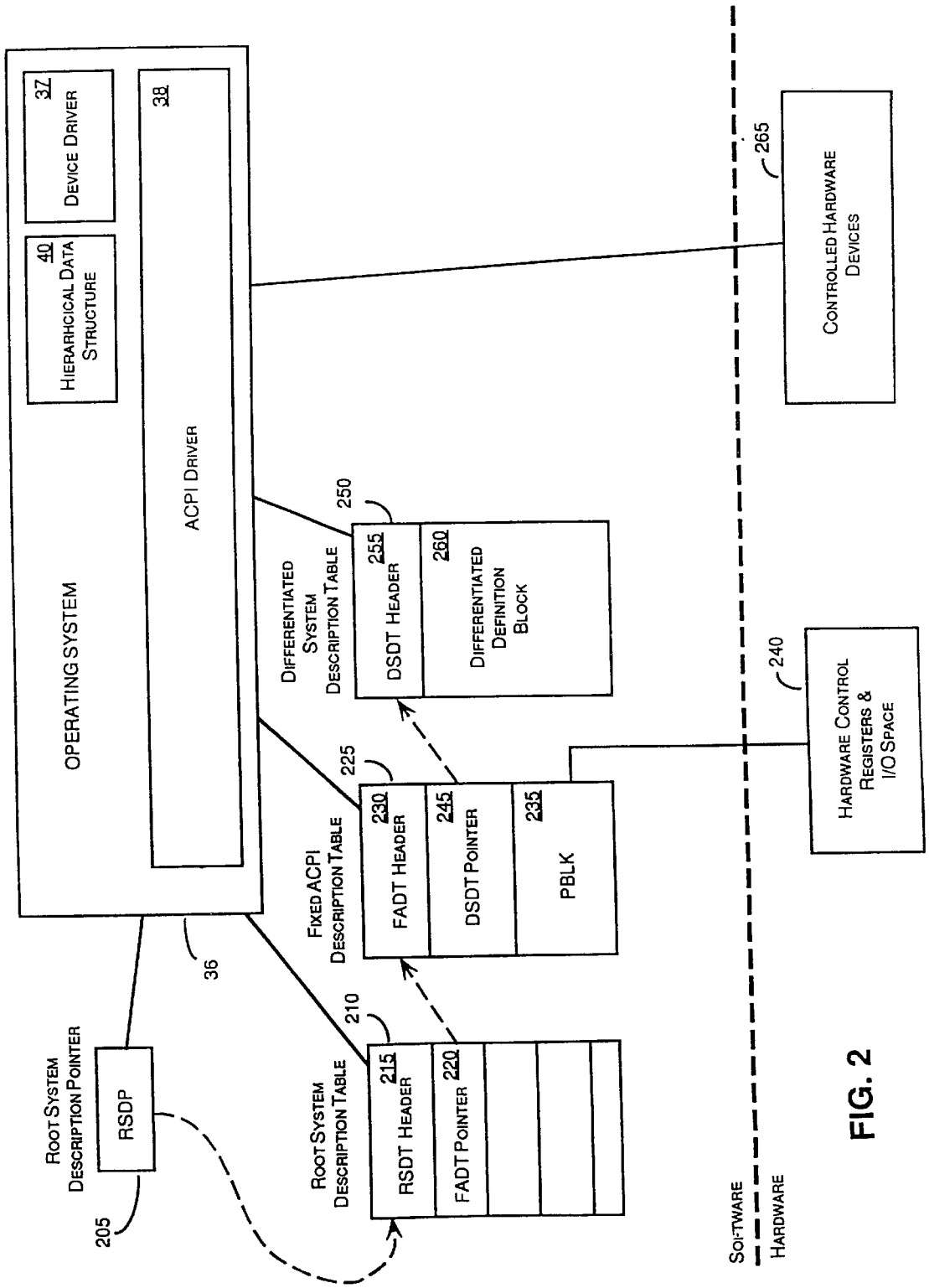
FIG. 2 is a block diagram of software modules and controlled hardware devices supporting steps in the preferred method for creating a hierarchical data structure in memory used to identify the devices and represent connections between the devices.

To maintain hardware flexibility, software modules (such as tables or definition blocks) are used to describe system information, features, and methods of controlling those features. These software modules are created by the original equipment manufacturer (OEM) who designed the computer hardware. These software modules are used when the personal computer 10 is initially booted using the BIOS 17. During this booting process, the HDS 40 is created in dynamic memory, such as RAM 13. FIG. 2 is a block diagram of software tables, software modules, and controlled hardware devices supporting steps in a preferred method for creating the HDS 40 in memory.

Referring now to FIGS. 1 and 2, a Root System Description Pointer (RSDP) 205 is located in the system memory 13 and is setup by the BIOS 17. The RSDP 205 contains an address of a Root System Description Table (RSDT) 210 which references other description tables. Description tables are setup by the BIOS 17 and provide data to the operating system 36, thus supplying the operating system 36 with knowledge of the computer system's implementation and configuration. The Root System Description Table 210 begins with an RSDT Header 215 containing (i) a signature label indicating how to interpret the table, (ii) a length of the Root System Description Table 210, and (iii) a checksum value for the Root System Description Table 210. One of the pointers within the Root System Description Table 210 is a Fixed ACPI Description Table (FADT) Pointer 220 providing the address of the Fixed ACPI Description Table 225.

Basically, the Fixed ACPI Description Table 225 is a table that includes entries that describe various static power management features of the hardware of the personal computer 10. The Fixed ACPI Description Table 225 has an FADT Header 230 containing a signature label, a length, and a checksum value for the Fixed ACPI Description Table 225. One entry is PBLK 235, a block of data that describes the implementation and static configuration details of hardware control registers and input/output (I/O) space 240 for power management, i.e., the static ACPI hardware register information. Another entry in the Fixed ACPI Description Table 225 is a Differentiated System Description Table (DSDT) Pointer 245 providing the address of the Differentiated System Description Table 250.

The Differentiated System Description Table 250, similar to the other description tables, has a DSDT Header 255 containing a signature label, a length, and a checksum value for the Differentiated System Description Table 250. The Differentiated System Description Table 250 contains a byte stream of data called a Differentiated Definition Block (DDB) 260 which essentially describes the hierarchical relationship of the hardware of the computer system 5. In particular, the DDB 260 contains implementation and configuration information on controllable hardware devices 265 that the operating system 36 can use to identify devices, identify hardware dependencies between devices, enhance the functionality of devices, and perform power management on devices, all of which goes beyond the static ACPI hardware register information mentioned above. Thus, the DDB 260 is the mechanism of how the BIOS 17 reports this hierarchical information to the operating system 36. The DDB 260 is discussed in more detail with regards to FIGS. 3, 4, and 5 below.

Figure 3A:
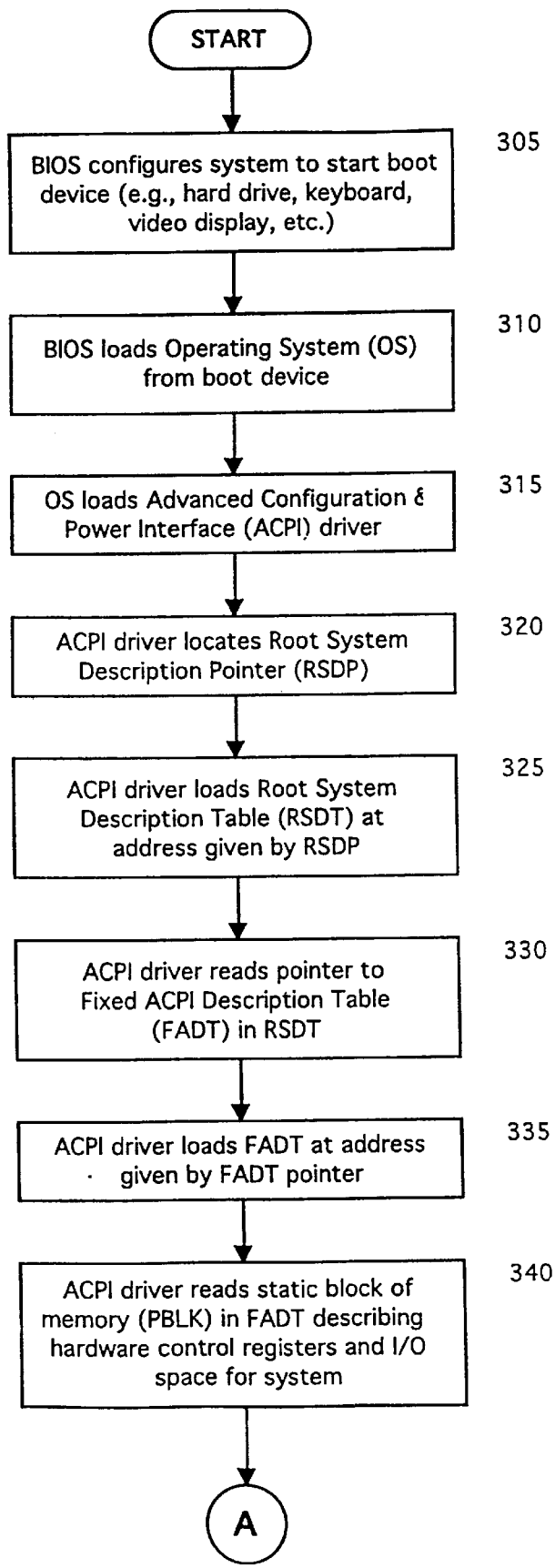
FIG. 3, consisting of FIGS. 3A–3B, is a flow diagram illustrating steps of the preferred method for booting up a computer system that creates a hierarchical data structure in dynamic memory.
Figure 3B:
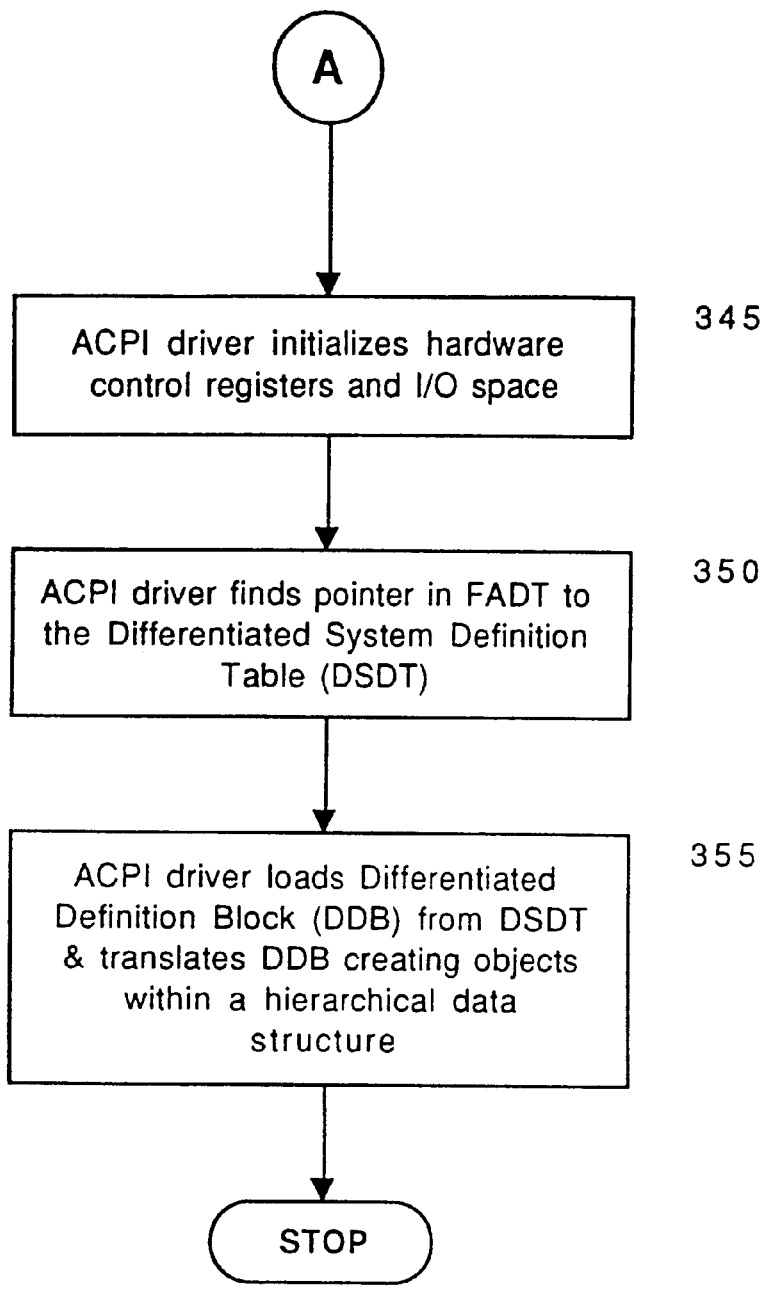

FIG. 3, consisting of FIGS. 3A and 3B, is a flow diagram illustrating the steps of the preferred method 300 for booting up a computer system 5 which creates the HDS 40 in RAM 15. Referring now to FIGS. 1, 2, and 3A, the preferred method 300 starts at step 305 where the BIOS 17 configures the computer system 5 to start a boot device, preferably the hard disk drive 20. Besides the boot device, one skilled in the art will appreciated that the BIOS 17 configures other hardware, such as the keyboard 51 and the video adapter 25. At step 310, the BIOS 17 loads the operating system (OS) 36 from the boot device. At step 315, the OS 36 loads the ACPI driver 38. At step 320, the ACPI driver 38 locates the Root System Description Pointer 205 in memory by searching a predetermined physical range of system memory 13. In the preferred embodiment, the range is 0E0000h to 0FFFFFh on 16 byte boundaries.

Once the ACPI driver 38 locates the Root System Description Pointer 205, the ACPI driver 38 loads the Root System Description Table 210 at step 325 from the address provided by the Root System Description Pointer 205. At step 330, the ACPI driver 38 reads the FADT Pointer 220 as an entry within the Root System Description Table 210. As previously discussed, the FADT Pointer 220 is a pointer to the Fixed ACPI Description Table 225. At step 335, the ACPI driver 38 loads the Fixed ACPI Description Table 225. In response to loading the Fixed ACPI Description Table 225, the ACPI driver 38 reads the static block of memory, PBLK 235, describing hardware control registers and I/O space 240 for the computer system 5 at step 340.

After step 340, the preferred method 300 continues at step 345 on FIG. 3B. Referring now to FIGS. 1, 2, and 3B, the ACPI driver 38 initializes the hardware control registers and I/O space 240, which are described by PBLK 235, at step 345. At step 350, the ACPI driver 38 finds a pointer, the DSDT Pointer 245, in the Fixed ACPI Description Table 225. The DSDT Pointer 245 is a memory address for the Differentiated System Description Table 250 that contains a definition block of data. As previously mentioned, this block of data is preferably a byte stream of data called the Differentiated Definition Block (DDB) 260.

At step 355, the ACPI driver 38 loads the DDB 260 from the table and translates the byte stream of data within the DDB 260 to create hierarchical information or hierarchically related objects within the HDS 40. Thus, the HDS 40 is initially created in dynamic memory after the operating system 36 starts and reads configuration and power management information supplied by an OEM in a definition block of data in ROM 14.

The HDS 40, preferably called an Advanced Configuration and Power Interface (ACPI) Namespace, is essentially a representation of the information interpreted from the contents of the DDB 260. The HDS 40 maintains a listing of the hierarchically related objects in dynamic memory. Essentially, each object named within the HDS 40 is used to identify devices 265, identify dependencies between devices 265, or provide an executable reference for controlling devices 265. The objects form a hierarchy within the HDS 40 that advantageously describe physical I/O connections between actual devices 265 of the computer system 5. However, the HDS 40 can store other information in addition to the information contained in the hierarchically related objects.

Figure 4:
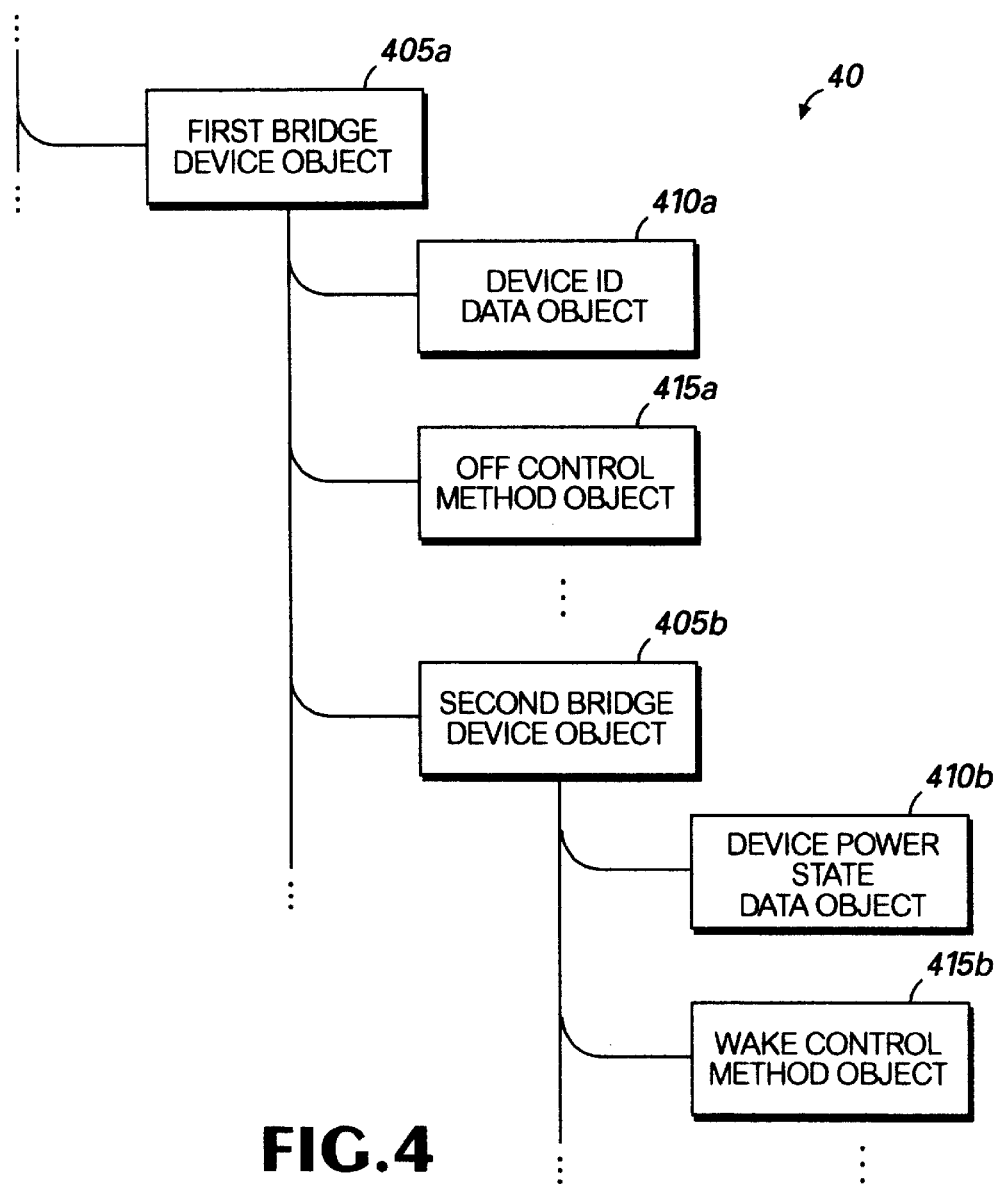
FIG. 4 is a diagram illustrating the contents of a hierarchical data structure as nested nodes within a hierarchy.

FIG. 4 is a diagram illustrating the contents of the HDS 40. Referring now to FIGS. 1, 2, 3A, 3B, and 4, a portion of contents of the HDS 40 are illustrated. There are different types of objects within the HDS 40. In the preferred embodiment, objects can include but are not limited to device objects (also known as bus/package objects), data objects, or control method objects.

A device object represents and identifies one of the controllable hardware devices 265 in the computer system 5. For example, a first bridge device object 405a may represent the first bridge 30 on the high speed bus 18, while a second bridge device object 405b may represent the second bridge 31 connected to the first bridge 30. In this manner, the hierarchy created in the HDS 40 represents the physical I/O connection between the first bridge 30 and the second bridge 31 in the computer system 5.

A device object, such as the first bridge device object 405a, generally refers to other objects referenced in the HDS 40 containing information about the associated device. More particularly, device objects are used to represent devices. The device objects are associated with other objects that define the device (such as the device ID for the device), that control the device (such as powering down the device or waking the device from a standby state), or that identify other devices connected to the represented device.

A data object, such as the device ID data object 410a or the device power state data object 410b, contains information about a device associated with the data object. In the preferred embodiment, this information may include configuration information about the device, dependency information on the device (e.g., which devices this device is physically connected to, which connectors or bridges this device is logically associated with or affected by, etc.), power states for the device, and the required power resources 35a–c needed by the device in each of the particular power states. For example, the device ID data object 410a directly below the first bridge device object 405a within the hierarchy of the HDS 40 contains the device ID of the first bridge 30. In another example, the device power state data object 410b contains information on which of the power resources 35a–c must be on to support the second bridge 31 in a designated device power state.

In general, a data object can contain such information about a device or could also function as what is called an "operational region" of the device. The "operational region" of the device essentially is an abstract manner of representing a hardware control register, I/O space, or another controllable element of the device. One skilled in the art will understand that the "operational region" is defined as a pseudocode language construct that provides the abstract manner of accessing the controllable elements of the device. Data objects can also contain system power state information, i.e., which of the power resources 35a–c must not be on to maintain the system in the particular system power state.

In the preferred embodiment, a data object contains data of a specified data type and with an initialized data width. Each data object has a visibility scope defining whether the object always refers to the same data (global) or the object uniquely refers to data given the current object (per instance). Data objects can be defined to have data values that are fields within a larger data object. This allows for a finer degree of control when representing controllable elements of devices by permitting access to individual bit fields in software, representing individual bits of the controllable element.

A control method object, such as the Off control method object 415a or the Wake control method object 415b, generally provides the mechanism for the operating system 36 to perform precise system-level hardware tasks with the devices 265 without the need to call a routine from the BIOS 17. For example, the Off control method object 415a is an executable control method for changing the status of the power resources 35a–c to switch the first bridge 30 from an "on" state to a powered down state. In another example, the Wake control method object 415b is an executable control method for changing the status of the power resources 35a–c to switch the second bridge 31 from the powered down state to the fully functioning "on" state.

In general, control method objects are a package object containing a series of pseudocode instructions that collectively represent a control method. Control method objects can advantageously reference or invoke other control method objects, thus providing a level of abstraction and portability.

In the preferred embodiment, control methods are written in a pseudocode language (p-code), which is analogous to a "virtual" machine-level assembly language for controlling the hardware devices 265 of the system. Pseudocode is any informal language construct or notation that can be interpreted and executed by a software interpreter. It is important to note that the actual pseudocode used to implement the preferred embodiment is arbitrarily chosen. One skilled in the art will realize that any pseudocode language instructions that perform the appropriate associated function, i.e., references or calls each of the desired objects to implement a control method, will fully implement this feature of the present invention.

The control methods are interpreted by part of the operating system 36, i.e., the ACPI driver 38. As the control method is interpreted, access to the actual device is accomplished by reading and writing to a special data object (operational region) representing a controllable element of the device, such as a control register or I/O space of the device. As previously mentioned, these special data objects provide an abstract, yet precise access down to the actual bit level, depending on how the special data object is defined. In this manner, the operating system 36 is allowed to interact with controllable hardware devices 265 on a low-level without having to rely on prior intimate knowledge of the system hardware devices or on supplied routines from the BIOS 17.

One important aspect of the HDS 40 is that the objects (e.g., 405A–415b) are hierarchically nested as nodes positioned within the HDS 40. For example, the first bridge device object 405a can have multiple other objects immediately below the first bridge device object 405a within the hierarchy of the HDS 40. These other objects include the device ID data object 410a, the Off control method object 415a, and the second bridge device object 405b. Furthermore, the second bridge device object 405b can have objects, such as the device power state data object 410b and the Wake control method object 415b, immediately "below" the second bridge device object 405b. In this manner, any objects positioned immediately below a device object in the HDS 40 are "associated" with the device referenced by the respective device object. Such objects are considered to be in a parent (device object) and child (other objects below the device object) relationship. Thus, the relationships between the objects within the HDS 40 correspond to the relationships between the hardware devices in the personal computer 10. In light of the above discussion on the HDS 40, those skilled in the art will recognize the advantage using nested objects within the HDS 40 to describe hierarchically nested devices in the computer system 5, such as the first bridge 30 that is connected to the second bridge 31, which is further connected to the low speed bus controller 33, which is further connected to the network interface 34.

Figure 5:
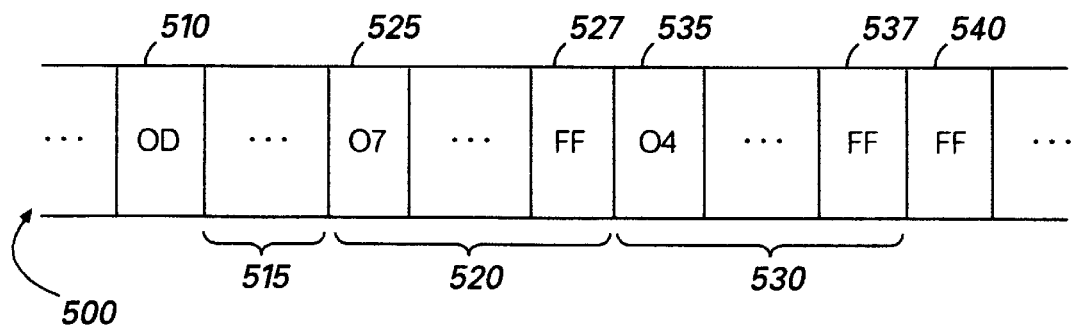
FIG. 5 is a diagram illustrating the contents of a byte stream of data from a definition block.

In the preferred embodiment, the byte stream of data from a definition block is made up of a sequence of bytes that are translated by the ACPI driver 38 when creating the HDS 40 in dynamic memory. FIG. 5 is a diagram illustrating the contents of an illustrative byte stream of data from a definition block, such as the DDB 260 (FIG. 2).

Referring now to FIGS. 2, 4, and 5, the illustrative byte stream of data 500 is essentially interpreted by the ACPI driver 38 from start to end. Within the byte stream, a lead byte 510 in the sequence signifies the beginning of an object definition.

The lead byte 510 has a value that is interpreted by the ACPI driver 38 to determine which kind of object (e.g., device object, data object, or control method object) is being defined by the bytes following the lead byte 510. In the illustrative byte stream of data 500 of FIG. 5, the value "OD" is the value of the lead byte 510 signifying that a device object is defined by the bytes that follow the lead byte 510 until a trailing byte 540 corresponding to the lead byte 510 is encountered. This is analogous to defining a conventional programming loop from a beginning code statement (lead byte 510) until a return command (trailing byte 540) is encountered.

After the lead byte 510, a series of bytes 515 define the name of the device object, such as the first bridge device object 405a. After the series of bytes 515 describing the name of the device object, the sequence of bytes defines other objects, such as the device ID data object 410a and the Off control method object 415a in the HDS 40, associated with the device object. In the illustrative embodiment, the ACPI driver 38 interprets the bytes 520 by first recognizing a leading byte 525, preferably having a value of "07", signifying that a data object (such as the device ID data object 410a) is defined by the bytes that follow the leading byte 525. The bytes following the leading byte 525 of the data object are interpreted as related to the data object until the ACPI driver 38 reads a trailing byte 527, preferably having a value of "FF".

Next in the illustrative byte stream of data 500 is the definition of a control method object (such as the Off control method object 415a). The ACPI driver 38 interprets the bytes defining the control method object 530 by first recognizing a leading byte 535, preferably having a value of "04", signifying that a control method object is being defined by the bytes that follow the leading byte of the control method object 535. The bytes following the leading byte 535 of the control method object are interpreted as related to the control method object until the ACPI driver 38 reads a trailing byte 527, preferably having a value of "FF".

Finally, the trailing byte 540, preferably having a value of "FF", appears in the illustrative byte stream of data 500 signifying the end of the device object definition. As previously mentioned, this trailing byte 540 completes the definition of the device object, similar to how a return command code completes the definition of a conventional programming loop. Thus, the illustrative byte stream of data 500 defines objects, such as the device object, that can be nested.

Those skilled in the art will quickly recognize that other objects can be defined in a definition block via a byte stream of data, besides those described above, in order to fully populate the HDS 40 with objects that identify and are associated with the controllable hardware devices 265 in the computer system 5. Those skilled in the art will recognize that the objects defined above in the illustrative byte stream of data 500 are merely illustrative and should not be interpreted as limiting.

In summary, loading of a definition block and creating the HDS 40 in dynamic memory is accomplished when the ACPI driver 38 reads and interprets the entire byte stream of data contained in the DDB 260, populates the HDS 40 with the appropriate objects, and then initializes each of the objects listed within the HDS 40.

Figure 6:
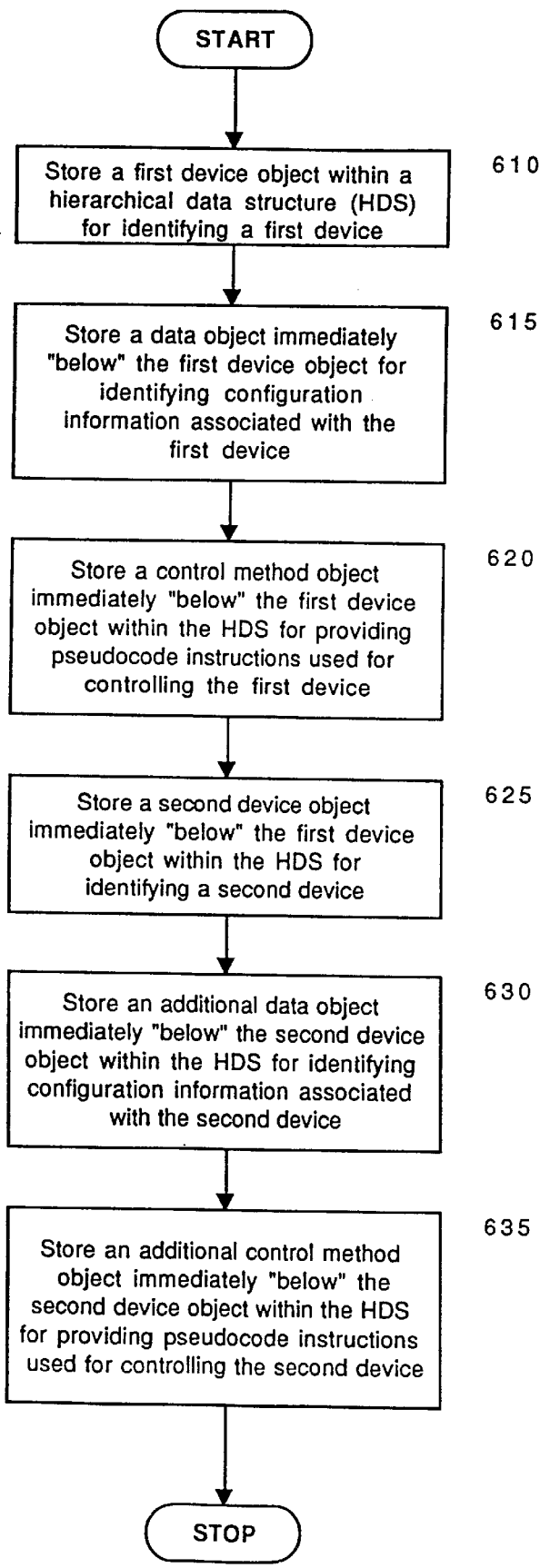
FIG. 6 is a detailed flow diagram illustrating steps of the preferred method for creating a hierarchical data structure in memory.

One aspect of the present invention is a method for creating a hierarchical data structure, such as the HDS 40, in dynamic memory wherein the data structure identifies devices in the computer system 5 and represents the physical I/O connections between the devices. FIG. 6 is a detailed flow diagram illustrating steps of the preferred method for creating such a hierarchical data structure in dynamic memory.

Referring now to FIGS. 1, 2, 4, and 6, the preferred method 600 starts at step 610 where a first device object 405a is stored within the HDS 40. The first device object, such as the first bridge device object 405a, identifies an associated first device in the computer system 5. The first device is one of the controllable hardware devices 265, such as the first bridge 30. The position or node where the first device object is located within the HDS 40 depends upon where within the hierarchically designed computer system 5 the associated first device is located.

There is a "root" or top of the hierarchy within the HDS 40. Top-level busses, such as the high speed bus 18, are represented under the root of the hierarchy within the HDS 40. Thus, devices connected to the high speed bus 18 are each below the root level of the hierarchy within the HDS 40.

The first device object is preferably implemented as a device object called an ACPI device object. Generally, the operating system 36 associates or establishes a relationship between ACPI device objects within the HDS 40 and standard Windows Driver Model (WDM) device objects outside of the HDS 40. Essentially, WDM device objects are cross-platform device objects used in the object-oriented operating environment of the "WINDOWS NT" or "WINDOWS 95" operating system to interact with a particular device. If there is no WDM device object for the particular device, the operating system 36 will create a new WDM device object in memory and associate the new WDM device object with the ACPI device object in the HDS 40. Those skilled in the art will be familiar with the object-oriented programming environments and software objects. Additional information on these topics is available by referring to "Inside Windows NT" published by Microsoft Press.

The first device object also provides a level of abstraction from the actual implementation of the first device. Those skilled in the art will recognize that in this manner, an advantageous degree of portability is achieved when identifying devices using the HDS 40.

At step 615, a data object, such as the device ID data object 410a, is stored immediately below the first device object in the hierarchy of the HDS 40. By virtue of being positioned immediately below the first device object, the data object is associated with the first device (the first bridge 30). The data object is used for identifying information associated with the first device, as previously mentioned. This information defines the dependent relationships between the first device and any other device within the computer system 5.

At step 620, a control method object, such as the Off control method object 415a, is stored immediately below the first device object. Similar to the data object, the control method object is associated with the first device (the first bridge 30). The control method object provides a control mechanism via one or more executable pseudocode instructions used to control the associated first device. In the preferred embodiment, the control method object is extensible and is an abstraction from the hardware implementation of the first device (the first bridge 30). As previously discussed, the control method object embodies these features by containing a sequence of pseudocode instructions.

These pseudocode instructions are preferably executed by the operating system 36 (or another software module such as the BIOS 17) to perform low-level system functions by interacting with operational regions associated with the first device. Thus, the operating system 36 is provided with a level of abstraction by virtue of the control method object because it needs only to call the control method object, rather than the specific pseudocode instructions, to control the associated device in a specific manner. This is advantageous because it provides a degree of portability for the OEM who defines the control method embodied within the control method object.

At step 625, a second device object, such as the second bridge device object 405b, is stored within the HDS 40. The second device object identifies an associated second device, such as the second bridge 31. The position within the hierarchy of the HDS 40 where the second device object is located is immediately below the first device object because the second device (the second bridge 31) is physically connected to the first device (the first bridge 30). Similar to the first device object, the second device object is preferably implemented as an extensible software object that provides a layer of abstraction from the hardware implementation of the second device.

At step 630, an additional data object, such as the device power state data object 410b, is stored within the hierarchy of the HDS 40 immediately below the second device object and, thus, is associated with the second device (the second bridge 31). The additional data object is used for identifying information associated with the second device.

At step 635, an additional control method object, such as the Wake control method object 415a, is stored within the hierarchy of the HDS 40 immediately below the second device object. Similar to the additional data object, the additional control method object is associated with the second device (the second bridge 31). The additional control method object provides one or more pseudocode instructions which represents an additional control method used to control the associated second device. The additional control method object is extensible and abstracted from the hardware implementation of the second device (the second bridge 31).

In summary, the HDS 40, also known as an ACPI Namespace in the preferred embodiment, is created in dynamic memory by storing objects within nested nodes of a hierarchy within the HDS 40. The hierarchy or connections between the nodes represents the physical I/O connections between devices in the computer system 5. Furthermore, the objects of the HDS 40 are used to identify devices (via device objects), to identify information related to the devices (via data objects), and to control the devices (via control method objects). However, it should be appreciated that other types of objects can be maintained within the HDS 40.

Once the HDS 40 has been created, the HDS 40 is generally used as a communication tool between hardware and software. For example, the HDS 40 may be used as a reporting mechanism in place of the prior art flat-list reporting mechanisms. An event associated with a device may be reported by the device. The operating system 36 is then prompted to identify the device within the computer system 5 by reading the HDS 40 and communicate with the identified device or another device. In general, the operating system may communicate with the devices by advantageously deriving messages from the contents of the HDS 40. These messages may serve a variety of functions by (1) controlling the device in a desired way, (2) enhancing the functionality of the device, (3) turning off individual devices or the computer system, and (4) turning on individual devices or the computer system 5 as a whole. These general functions use the HDS 40 in a variety of ways, as described in more detail below with regard to FIGS. 7–14.

CONTROLLING A DEVICE USING A HIERARCHICAL DATA STRUCTURE

Figure 7:
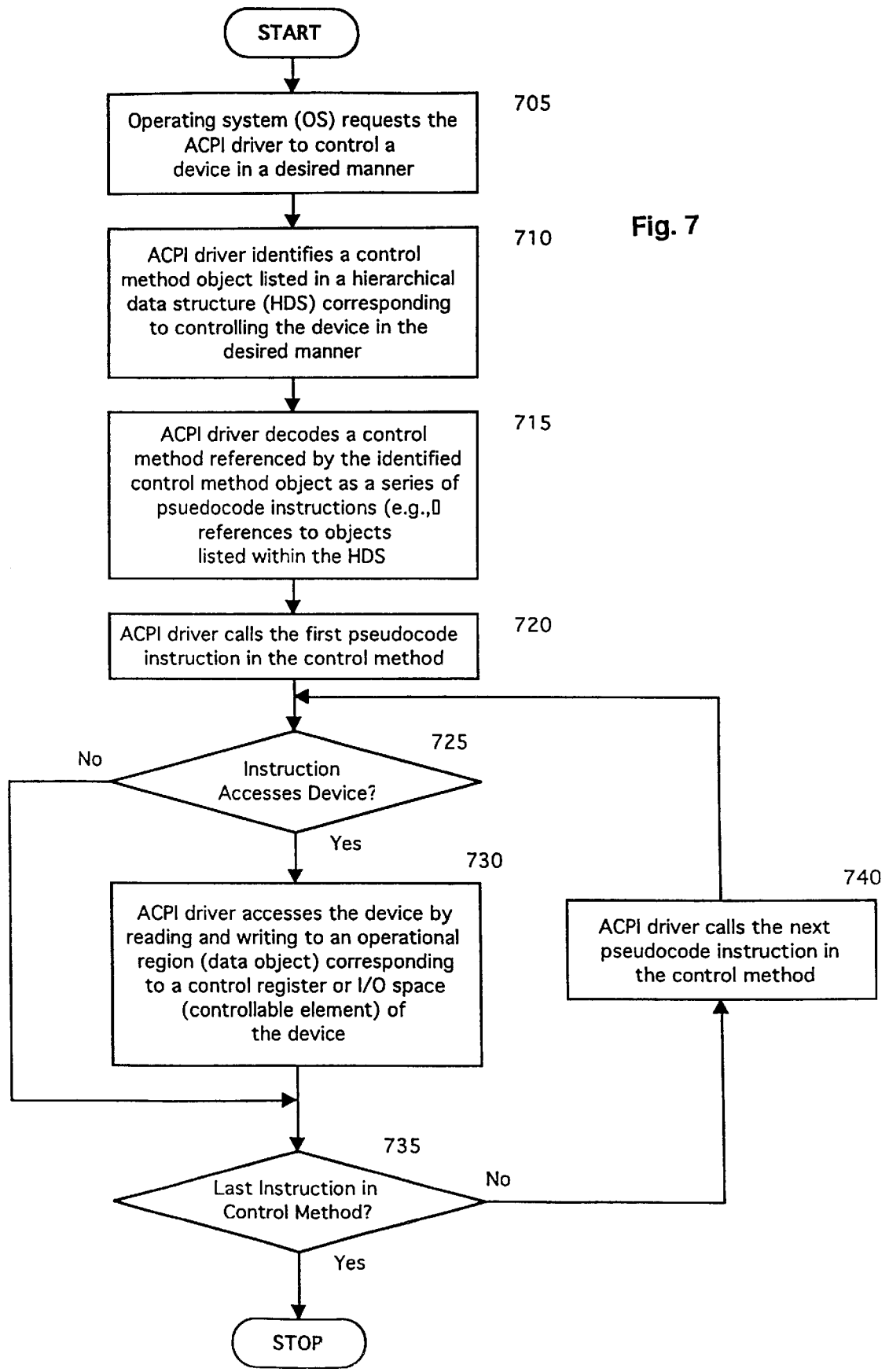
FIG. 7 is a flow diagram illustrating steps of the preferred method for controlling hardware devices within a computer system using a hierarchical data structure.

Another aspect of the present invention is using the HDS 40 to control devices within the computer system 5 preferably using pseudocode control methods. In this manner, software modules, such as the operating system 36 or the BIOS 17, can use the HDS 40 to efficiently and effectively communication with controllable hardware devices. FIG. 7 is a flow diagram illustrating steps of the preferred method for controlling hardware devices 265 within a computer system 5 using the HDS 40.

Referring now to FIGS. 1, 2, 4, and 7, the preferred method 700 starts at step 705 where the operating system 36 requests the ACPI driver 38 to control one of the devices 265 in a desired manner. The desired manner may be to control the device by turning off or powering down the device.

At step 710, the ACPI driver 38 identifies a control method object listed in the HDS 40 corresponding to controlling the device in the desired manner. For example, the operating system 36 may desire to turn off or power down the first bridge 30 to conserve power within the computer system 5. The Off control method object 415a can be used by the operating system 36 to power down the first bridge 30. The ACPI driver would identify the Off control method object 415a below the first bridge device object 405a within the HDS 40.

At step 715, the ACPI driver 38 decodes a control method embodied within the identified control method object, such as the Off control method object 415a, as a series of pseudocode instructions (e.g., references to other objects listed within the HDS 40). For example, one such object referenced by a pseudocode instruction may be an operational region associated with the first bridge 30. The pseudocode instructions can reference or call other control method objects, thus providing a level of abstraction for the control method.

At step 720, the ACPI driver 38 executes the control method by calling the first pseudocode instruction referenced by the decoded control method. At step 725, if the referenced object accesses the actual device, then the ACPI driver indirectly accesses the device at step 730. Otherwise, step 725 proceeds directly to step 735.

At step 730, the ACPI driver 38 accesses the device in by reading and writing to an operational region corresponding to a controllable element of the device. As previously mentioned, the operational region is a pseudocode language abstraction that acts as an interface to a control register or I/O space (controllable elements) for the device. For example, specific I/O registers could be defined as the "CONTROL" operational region. By reading and writing to the "CONTROL" operational region, these specific I/O registers can be accessed. Using such a method of accessing the device, the operating system 36 is allowed to interact with the devices on a low-level without having to rely on prior intimate knowledge of the device or routines from the BIOS 17.

At step 735, if the instruction is the last instruction in the executed control method, then the preferred method 700 ends. Otherwise, step 735 proceeds to step 740 where the ACPI driver calls the next pseudocode instruction in the executed control method before proceeding back to step 725. In summary, the operating system 36 is able to advantageously control the device on a low-level with pseudocode instructions that are executed by the operating system 36 without having to rely upon the routines in the BIOS 17 or the device driver 37. Thus, the use of pseudocode instructions provide very precise control of a device that is processor 12 and operating system 36 independent.

ENHANCING THE FUNCTIONALITY OF A DEVICE USING A HIERARCHICAL DATA STRUCTURE

Figure 8:
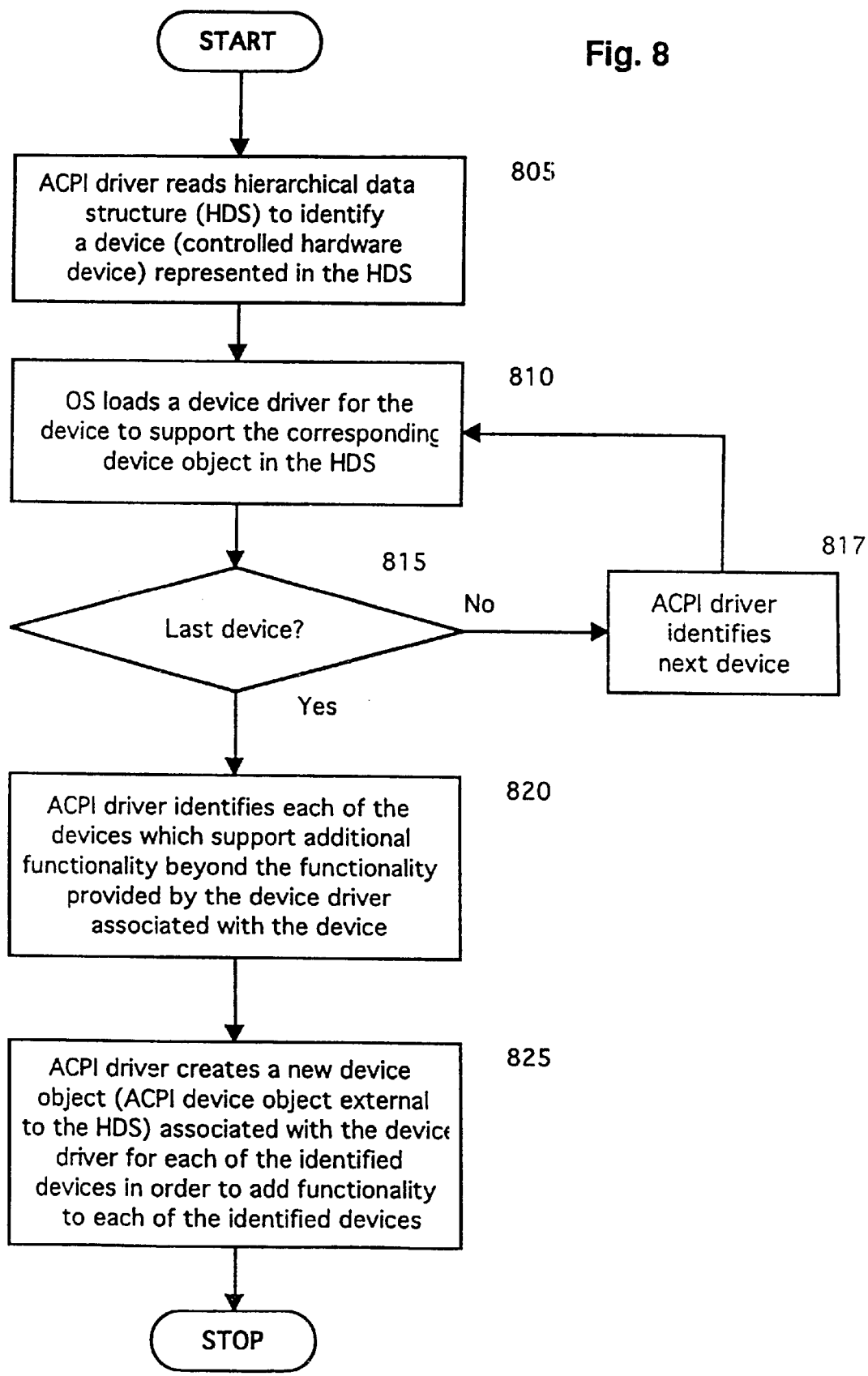
FIG. 8 is a flow diagram illustrating steps of the preferred method for enhancing the functionality of controlled hardware devices within a computer system using a hierarchical data structure.

Another aspect of the present invention is using the HDS 40 to enhance the functionality of the devices in the computer system once the HDS 40 has been created in dynamic memory. FIG. 8 is a flow diagram illustrating steps of the preferred method for enhancing functionality of controlled hardware devices within a computer system using the HDS 40. In the preferred embodiment, these steps are typically performed after the steps of the preferred method 300 for booting a computer system 5 that creates the HDS 40 (FIG. 3).

Referring now to FIGS. 1, 2, 4, 7, and 8, the preferred method 800 starts at step 805 where the ACPI driver 38 reads the HDS 40 to identify one of the devices represented in the HDS 40. This is accomplished by searching the objects within the HDS 40 for any device objects, such as the first bridge device object 405a and the second bridge device object 405b.

At step 810, the operating system 36 loads an appropriate device driver 37 for the identified device to support the corresponding device object. As previously mentioned, the device driver 37 is a conventional software module used by the operating system 36 to access devices connected to the computer system 5. Device drivers 37 are typically provided by the OEM who supplies the associated device. Thus, the device driver 37 provides the operating system 36 with the functionality of the device.

At step 815, if the identified device is not the last of the devices represented in the HDS 40, the next device is identified in step 817 before proceeding back to step 810. Otherwise, if the identified device is the last of the devices, the method 800 proceeds to step 820.

At step 820, the ACPI driver 38 identifies each of the devices which support additional functionality beyond the functionality provided by the device driver associated with the device. The ACPI driver 38 preferably accomplishes this by searching within the HDS 40 for any data objects or control method objects below each of the identified device objects from step 805. In other words, if an identified device object has either a data object or control method object below it within the HDS 40, additional functionality for the device associated with the identified device object is provided within the HDS 40. This additional functionality is in addition to the functionality provided by the device driver 37 for the device associated with the identified device object.

Thus, at step 825, the ACPI driver 38 creates a new device object which is associated with the device driver 37 for each of the identified devices in step 820. The new device object, also called an ACPI device object, is created external to the HDS 40 and essentially functions as a filtering mechanism. In the preferred embodiment, when the operating system 36 needs to exercise specific functions of a device, the operating system 36 generates a conventional Input/Output Request Packet (IRP) directed to the device driver 37 associated with the device. Normally, the device driver 37 would process the IRP to provide the requested functionality. However, the new device object intercepts the IRP to determine if the requested functionality is supported by the device driver 37. If not, the new device object directs the IRP to the ACPI driver 38 where the additional functionality of the device is provided. The ACPI driver 38 provides the additional functionality by executing control methods referenced in the HDS 40 associated with the requested device. Those skilled in the art will be familiar with the conventional concept of IRPs that are generated and processed by parts of an operating system when the requesting process requires a device to operate in a desired manner. Further information regarding IRPs is available in "Inside Windows NT", published by Microsoft Press. Therefore, in the preferred embodiment, the overall functionality of the associated device is extensibly enhanced via the new device object associated with the device driver 37 without actually modifying the device driver 37.

DYNAMIC CHANGES TO THE HIERARCHICAL DATA STRUCTURE

Figure 9A:
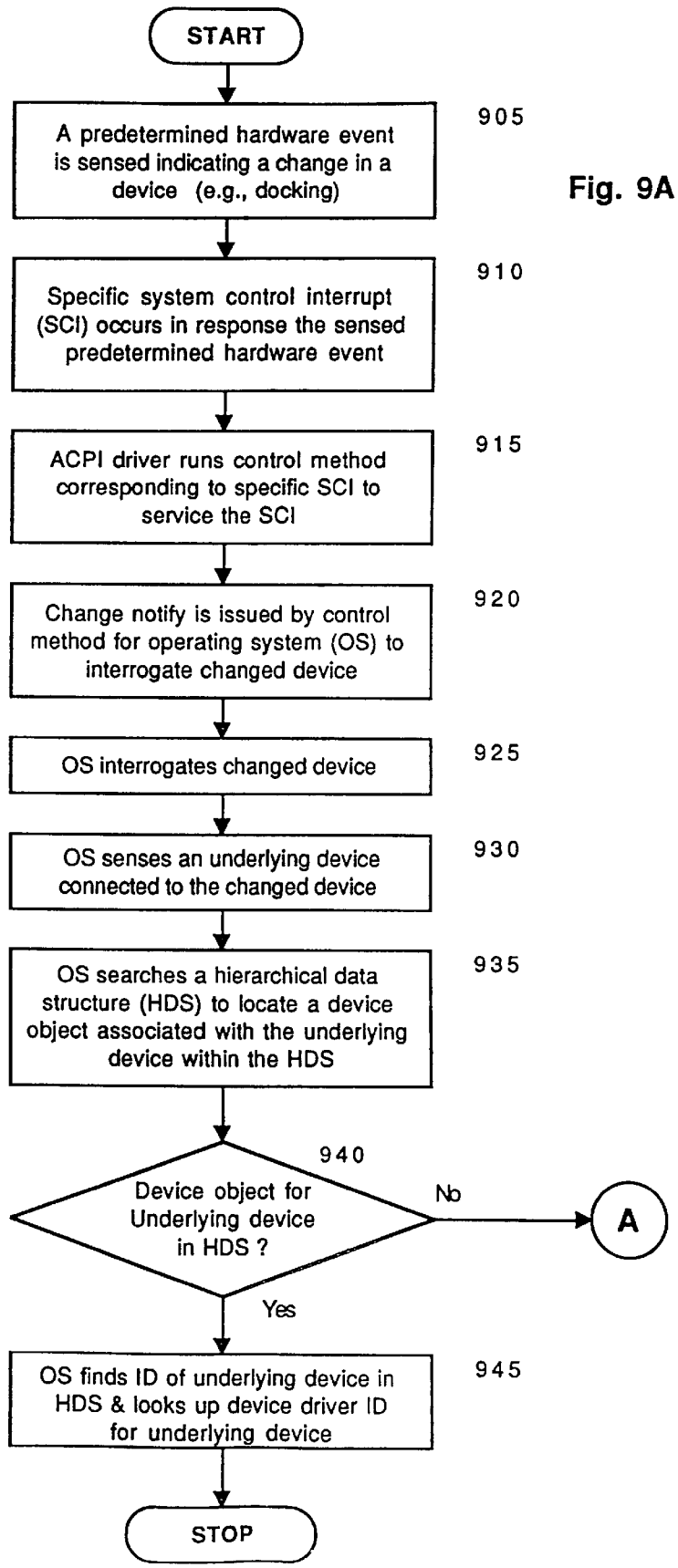
FIG. 9, consisting of FIGS. 9A–9B, is a flow diagram illustrating steps of the preferred method for dynamically expanding a hierarchical data structure.
Figure 9B:
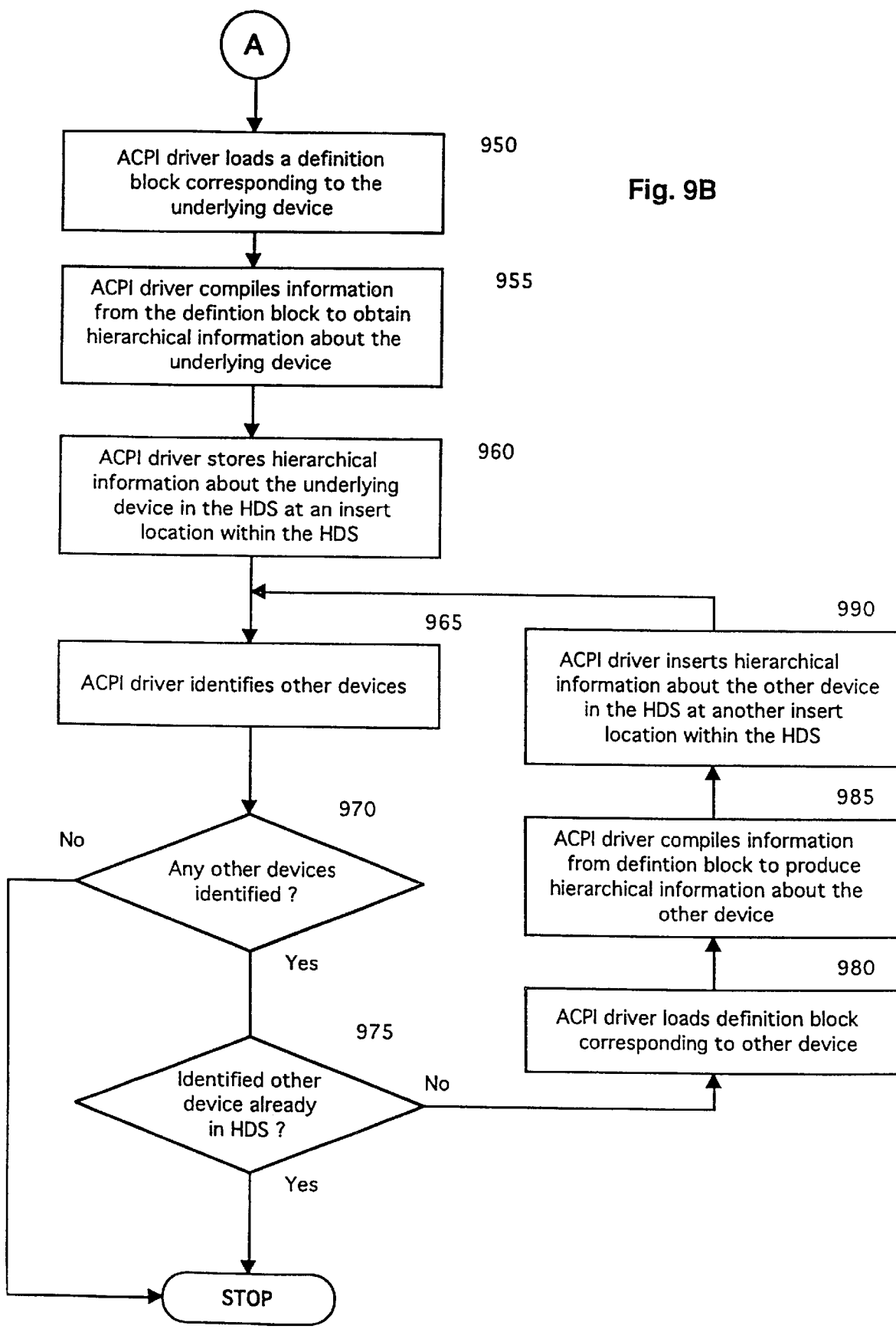
Figure 10:
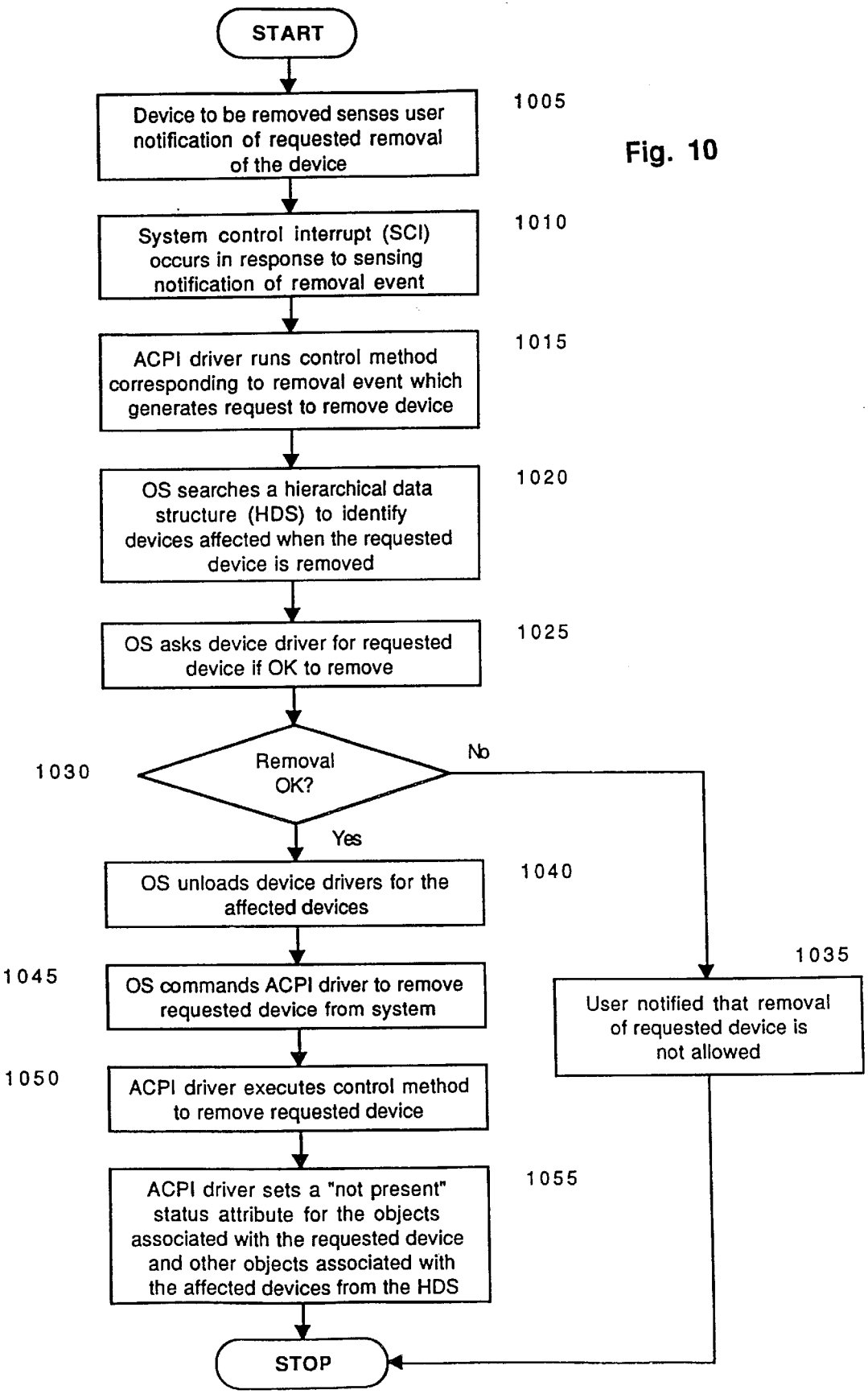
FIG. 10 is a flow diagram illustrating steps of the preferred method for dynamically modifying a hierarchical data structure.

Another aspect of the present invention is the ability to dynamically expand or modify a hierarchical data structure in response to configuration changes within a computer system. The actual devices present within the computer system 5 can dynamically change during run-time operation when compared to the devices present within computer system 5 during the booting procedure. New devices may be connected to a device or onto a bus, such as the high speed bus 18. Existing devices may be removed from the computer system 5. For example, if a new device or group of devices, such as the devices in the docking station 11, were connected to or removed from the portable personal computer 10 during run-time operations, the HDS 40 can be dynamically changed to reflect the change within the computer system 5. FIG. 9, consisting of FIGS. 9A–9B, is a flow diagram illustrating steps of the preferred method for dynamically expanding a hierarchical data structure. FIG. 10 is a flow diagram illustrating the preferred steps for dynamically collapsing a hierarchical data structure.

Referring now to FIGS. 1, 4, and 9A, the preferred method 900 starts at step 905 where a predetermined hardware event is sensed within the computer system 5. This hardware event could be the occurrence of "hot docking" the portable personal computer 10 into the docking station 11. The hardware event may be sensed by one of the controllable hardware devices or may be sensed via a signal from another software module.

At step 910, a specific interrupt, preferably called a system control interrupt (SCI), occurs in response to the sensed predetermined hardware event. At step 915, the ACPI driver 38 services the SCI by running a control method corresponding to the specific interrupt that occurred in step 910.

At step 920, this executed control method sends a notification, preferably called a "Change Notify" notification, to the operating system 36. The notification informs the operating system 36 that a change has occurred specifically within one of the devices (i.e., the changed device) in the computer system 5, such as the first bridge 30. Informing the operating system 36 of where the change has occurred is advantageous because the operating system 36 no longer has to inefficiently search the entire computer system 5 for potential configuration changes.

At step 925, the operating system 36 responds to the notification by interrogating the changed device. Typically, registers associated with the changed device contain status information which is read by the operating system 36.

At step 930, the operating system 36 senses an underlying device connected to the changed device in response to interrogating the changed device. For example, the first bridge 30 (changed device) would signal a change has occurred when the portable personal computer 10 is docked or connected to the docking station 11. The operating system 36 would interrogate the first bridge 30 (changed device) to find the second bridge 31 (underlying device) connected to the first bridge 30.

At step 935, the operating system 36 searches the HDS 40 to identify the underlying device by looking for device objects within the HDS 40 that identify the underlying device.

At step 940, if there is a device object within the HDS 40 representing or identifying the underlying device, then step 940 proceeds to step 945. At step 945, the operating system 36 identifies the underlying device by locating the device ID of the underlying device within the HDS 40 and the ID of the device driver for the underlying device within the HDS 40. In the preferred embodiment, this information (device ID and device driver ID) would be maintained in data objects maintained within the HDS 40. After step 945, the preferred method 900 ends.

However, if there is not a device object within the HDS 40 representing the underlying device, step 940 proceeds to step 950 on FIG. 9B. For example, this would be the case if the second bridge device object 405b (corresponding to the underlying device) was not located within the HDS 40 and was not fully supported through other standards after the portable personal computer 10 was connected or docked with the docking station 11.

Referring now to FIGS. 1, 4, 5, and 9B, the ACPI driver 38 loads a definition block corresponding to the underlying device at step 950. Although the definition block is preferably loaded if there is no device object in the HDS 40 representing the underlying device, it should be understood that definition blocks may be loaded into the HDS 40 for other reasons and at other times.

At step 955, the ACPI driver 38 compiles or translates the byte stream information contained within the definition block to obtain hierarchical information about the underlying device. This hierarchical information includes the contents (device objects, data objects, control method objects) that are maintained within the HDS 40. At step 960, the ACPI driver 38 stores the hierarchical information about the underlying device at an insert location within the HDS 40. For example, if the second bridge device object 405b was not currently within the HDS 40, the hierarchical information obtained from a definition block for the second bridge 31 and inserted in the HDS 40 may include the device power state data object 410b and the Wake control method object 415b.

The insert location is preferably provided as a node or position within the hierarchy of the HDS 40 relative to the node or position of an existing object. Alternatively, the insert location can be provided as an absolute position within the hierarchy of the HDS 40 relative to the root level of hierarchy of the HDS 40.

At step 965, the ACPI driver 38 identifies any other devices that have associated device objects within the updated HDS 40, preferably by reading the updated HDS 40. This situation occurs when the underlying device has other devices connected to it or nested within it. For example, if the underlying device is the second bridge 31, then the ACPI driver 38 would find a device object within the updated HDS 40 for the second low speed bus controller 33.

At step 970, if the ACPI driver does not identify any other devices (via located device objects below the underlying device object) in the updated HDS 40 from step 965, then the preferred method 900 ends with the newly expanded HDS 40. However, if the ACPI driver identifies any other devices in the updated HDS 40 from step 965, then step 970 proceeds to step 975.

At step 975, if the identified other device already has a device object listed within the HDS 40, then the preferred method 900 ends. However, if the identified other device does not have a corresponding device object listed within the HDS 40, then step 975 proceeds to step 980.

Essentially, steps 980–990 repeat steps 950–960 for the identified other device by loading a definition block at step 980, obtaining hierarchical information about the identified other device at step 985, and inserting the hierarchical information about the identified other device at another insert location within the HDS 40 at step 990. After step 990, the preferred method returns to step 965 to identify any other devices that may be referenced after the HDS 40 was updated in step 990. Thus, the process embodied by steps 965–990 is repeated until each device that is hierarchically connected to the changed device has associated hierarchical information listed within the HDS 40.

It should be understood that the present invention should not be limited to the exemplary embodiment of loading definition blocks when a device is not identified within the HDS 40. The important point of this aspect of the present invention is that definition blocks may be dynamically loaded into specific locations of the HDS 40 after the HDS 40 has been initially created in memory.

As previously mentioned, in addition to the capability of dynamically expanding the HDS 40, the HDS 40 can be dynamically modified in response to configuration changes, such as hardware events. This aspect of the present invention is illustrated by the flow diagram shown in FIG. 10. Referring now to FIGS. 1, 2, 5, and 10, the preferred method 1000 for modifying the HDS 40 starts at step 1005 where a device senses a user notification of a requested removal event, i.e., the device (one of the controllable hardware devices 265) is to be removed from the computer system 5. For example, if the user is trying to remove or eject the portable personal computer 10 from the docking station 11, the notification will take the form of the user pressing an EJECT button on the exterior of the docking station 11.

At step 1010, an interrupt (preferably called an SCI) occurs in response to sensing notification of the requested removal event. At step 1015, the ACPI driver 38 runs a control method, preferably using pseudocode instructions, corresponding to the removal event. The executed control method generates a request to remove the device. At step 1020, the operating system 36 searches the HDS 40 to determine and identify which of the devices 265 within the computer system 5 are affected when the requested device is removed.

A device can be affected by the requested device in several ways. First, a device is affected if the device is directly connected to the requested device. For example, the second low speed bus controller 33 is affected when the second bridge 31 is removed (i.e., when the portable personal computer 10 is ejected out of the docking station 11).

Second, a device is affected if the device is directly connected to another device, which is ultimately connected to the requested device. For example, the network interface 34 is affected when the second bridge 31 is removed.

Finally, a device may still be affected if the device has a physical connection that is affected by the requested device. This situation appears when distinct buses or distinct physical I/O connections are routed through a single connector. When one connection through the single connector is severed, an assumption is typically made that all connections routed through the single connector are severed and devices using each of the distinct busses or distinct physical I/O connections may be affected.

As previously mentioned, the HDS 40 contains data objects associated with devices 265 in the computer system 5. These data objects contain information describing the dependencies of the associated device, i.e., which devices 265 must be present to support a given device within the computer system 5. Thus, any device objects below the device object corresponding to the requested device and any data objects describing a dependency upon the requested device will identify affected devices within the computer system 5.

At step 1025, the operating system 36 asks the device driver 37 for each of the affected devices if the requested device can be removed. Typically, the requested device can be removed unless a device driver 37 from one of the affected devices is performing an operation that cannot be interrupted without data loss. At step 1030, if the requested device cannot be removed, then step 1030 proceeds to step 1035 where the user is notified that removal of the requested device is not permitted, typically via a pop-up dialog window displayed on the video display 24. After step 1035, the preferred method 1000 ends.

However, if the requested device can be removed, then step 1030 proceeds to step 1040 where the operating system 36 unloads the device drivers 37 associated with the affected devices. At step 1045, the operating system 36 commands the ACPI driver 38 to remove the requested device from the computer system 5. This is accomplished at step 1050 where the ACPI driver 38 executes the appropriate control method for removing the requested device (ejecting the portable personal computer 10 from the docking station 11).

Finally, at step 1055, the ACPI driver 38 sets a status attribute on any object (e.g., device objects, data objects, control method objects) from within the HDS 40 associated with the requested device and any object from within the HDS 40 associated with the affected devices. The status attribute essentially indicates that the device associated with this object (the requested device and the affected devices) is no longer present within the computer system 5. In this manner, the HDS 40 can be modified to reflect what hardware is present in the computer system without having to actually remove any objects from within the HDS 40.

In an alternative embodiment, these objects are removed from the HDS 40 when the ACPI driver 38 executes an initialization control method to unload the above-mentioned objects from the HDS 40. Essentially, unloading the objects is the reverse of loading the objects from a definition block. After step 1055, the preferred method 1000 ends. Thus, the HDS 40 can be dynamically modified (via setting status attributes or removing objects) during run-time operation of the computer system 5 in response to configuration changes and other hardware events within the computer system 5.

In summary, the HDS 40 can be expanded to dynamically reflect new devices introduced into the computer system without having to interrogate every device within the system. The HDS 40 can also be modified to reflect the removal of existing devices from the computer system.

POWER MANAGEMENT USING THE HIERARCHICAL DATA STRUCTURE

Another aspect of the present invention involves using a hierarchical data structure to manage the power consumption of devices within a computer system. As mentioned earlier, the HDS 40 contains information on each device 265 within the computer system 5. Some of this information includes which power resources 35a–c are needed from the system in order to maintain the device in a given device power state. This information is maintained in a data object within the HDS 40, such as the device power state data object 410b (FIG. 4).

In general, a device power state essentially defines the power consumption and power requirements of a device 265 in that particular device power state. In the preferred embodiment, there are distinct device power states defined for each device 265. D0 is the "fully on" state of a device 265 with the highest level of power consumption. D1 and D2 are device states for a device 265 where D1 saves more power than D0 and D2 saves more power than D1. Typically, D1 and D2 device power states may be referred to as the "standby" and "suspend" states. D3 is the "fully off" power state of the device 265 where all power is removed and the device context is lost upon entering this state. Typically, device context information includes small amounts of information stored in volatile memory within the device 265.

Certain data objects, called power management objects in the preferred embodiment, maintained in the HDS 40 list the device power requirements of a device in order for the device to be in a corresponding device power state (D0, D1, or D2). These data objects are positioned within the hierarchy of the HDS 40 below a device object which identifies the device. In other words, these data objects are used to identify which shared power resources 35a–c in the computer system 5 must be on to support a particular device power state for an associated device. For example, the device power state data object 410b identifies which of the power resources 35a–c must be on to support a particular device power state for the second bridge 31.

Another set of objects referenced in the HDS 40 is a group of special data objects describing the power state of the system. These special data objects contain information about the computer system 5 as a whole and are not associated with any particular controllable hardware device 265. In the preferred embodiment, these special data objects are referenced on the root level of the hierarchy within the HDS 40. Basically, a system power state differs from a device power state in that the system power state defines which shared power resources 35a–c (e.g., shared power planes, shared clock sources, shared isolation buffers) must be off when the system is in that particular system power state.

Similar to the device power states, there are distinct system power states, S0–S4. S0 is the "working" state. S1–S3 are "sleeping" states where an increasing number of the shared power resources 35a–c are required to be off to support logically lower system power states (S0 being the highest & S4 being the lowest). S4 is the system power state where all shared power resources 35a–c are off.

Figure 11:
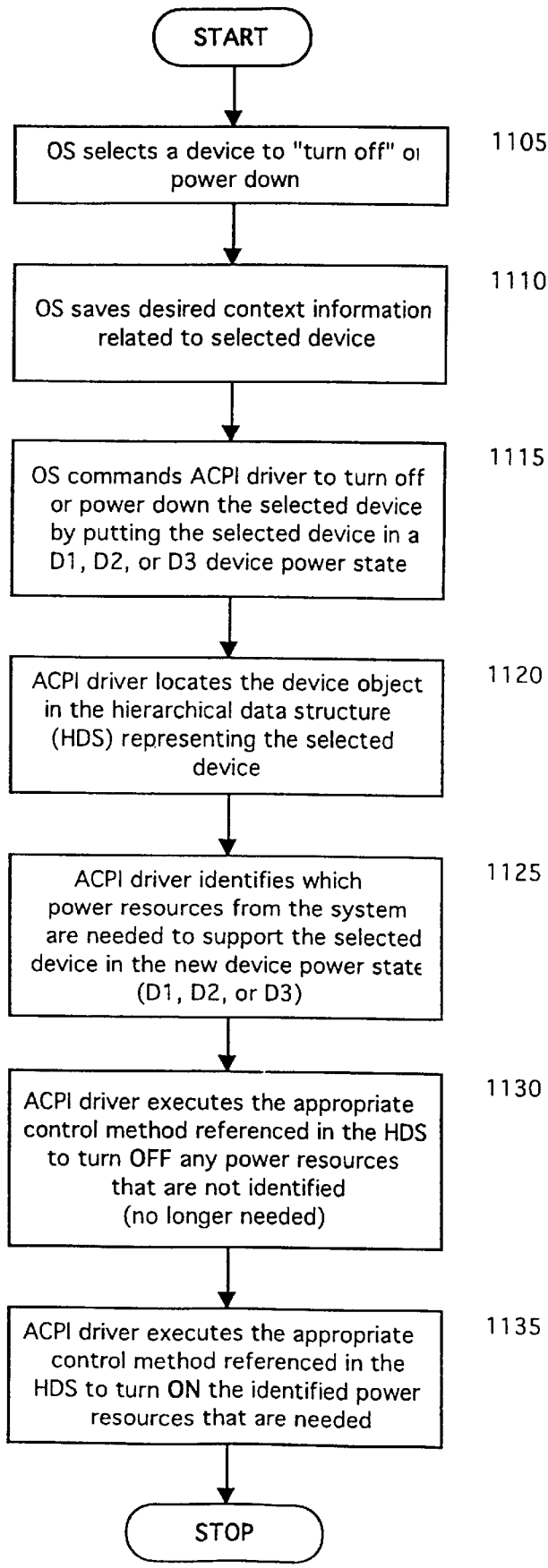
FIG. 11 is a flow diagram illustrating steps of the preferred method for powering down a device within a computer system using a hierarchical data structure.

Given this preface on the above-mentioned power management information within the HDS 40, FIGS. 11–14 are flow diagrams illustrating methods for managing power consumption within a computer system using a hierarchical data structure. FIG. 11 is a flow diagram illustrating steps of the preferred method for powering down a device within a computer system using a hierarchical data structure.

Referring now to FIGS. 1, 2, 4, and 11, the preferred method 1100 starts at step 1105 where the operating system 36 selects a device to power down. In other words, the operating system 36 selects a device to place in a lower power consumption device power state. At step 1110, the operating system 36 saves any desired context information related to the selected device. As previously mentioned, device context information includes small amounts of information stored in volatile memory within a device. At step 1115, the operating system 36 commands the ACPI driver 38 to turn off or power down the selected device by putting the device into the appropriate device power state, typically either the D1, D2, or D3 device power state.

At step 1120, the ACPI driver 38 searches within the HDS 40 to locate the device object representing or identifying the selected device. At step 1125, the ACPI driver 38 identifies which power resources 35a–c from the computer system 5 are needed to support the selected device in the new device power state. The ACPI driver 38 finds this information within one of the referenced data objects below the located device object in the HDS 40. For example, if the selected device is the second bridge 31, the device power state data object 410b is below the second device object 410a and maintains information on which power resources 35a–c must be on to support the second bridge 31 in a particular device power state.

More particularly, the power resources identified at step 1125 may include power resources that may not have been previously on. For example, one power resource, such as power resource #1 35a, may be a larger current power plane while another power resource, such as power resource #2 35b, within the computer system 5 may be a lower current power plane. Should a given device no longer require as much current to exist in appropriate device power state, the lower current power plane would become identified as one of the power resources 35a–c to minimize power consumption in the appropriate device power state.

At this point, the operating system 36 knows what power resources 35a–c must be on for the selected device in the new power state as well as which power resources 35a–c must be on for all of the other devices in their existing device power states. At step 1130, the ACPI driver 38 executes the appropriate control method listed within the HDS 40 to turn off any of the power resources 35a–c that are not identified and no longer needed. Finally, at step 1135, the ACPI driver executes the appropriate control methods listed within the HDS 40 to turn on any of the power resources 35a–c that are identified as required in the new device power state. In the preferred embodiment, the above-mentioned control methods are implemented using pseudocode control methods maintained in control method objects that are interpreted by the ACPI driver 38.

Figure 12:
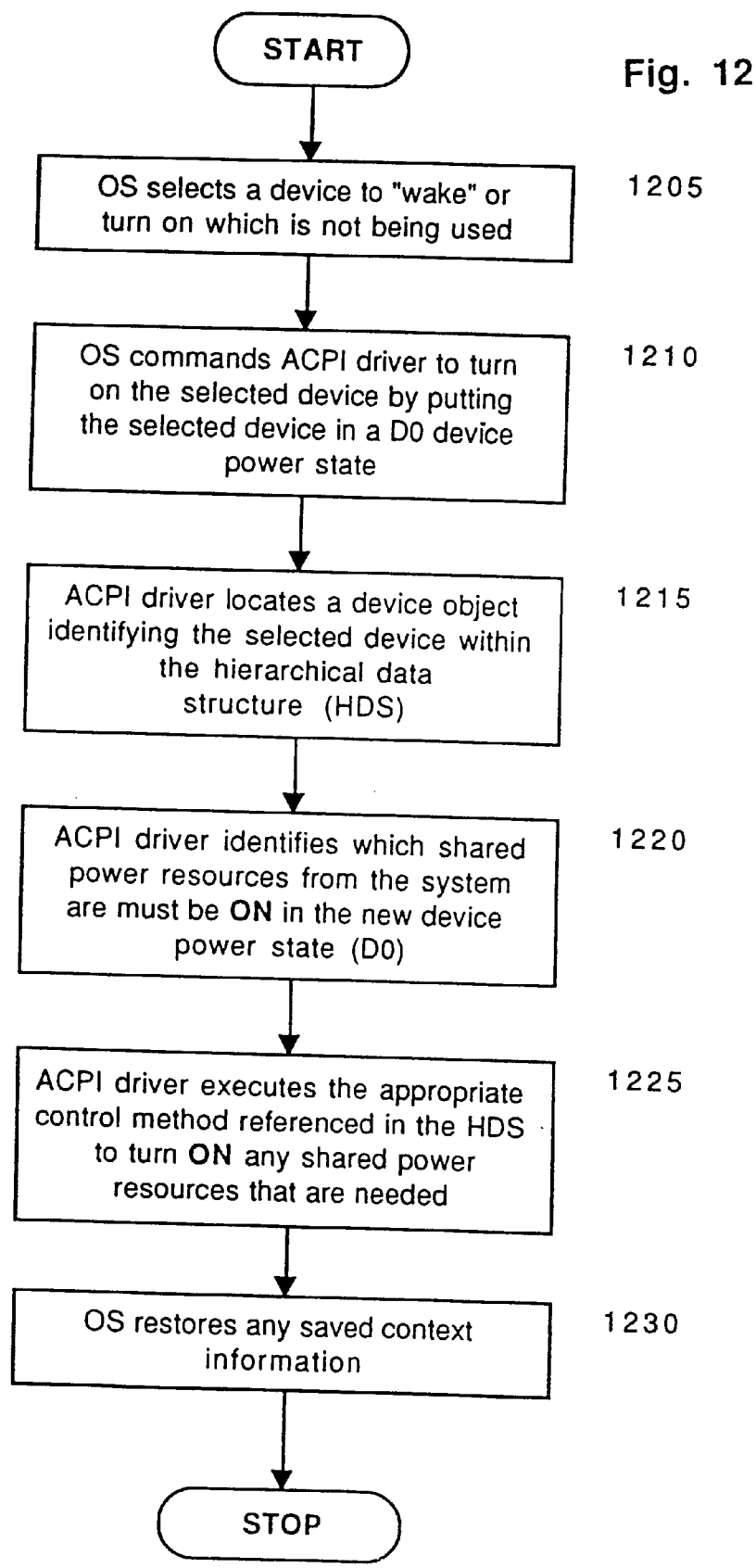
FIG. 12 is a flow diagram illustrating steps of the preferred method for turning on a device within a computer system using a hierarchical data structure.

The operating system 36 uses the HDS 40 to turn on or "wake" a device from a powered down device power state. FIG. 12 is a flow diagram illustrating steps of the preferred method for turning on a device within a computer system using a hierarchical data structure.

Referring now to FIGS. 1, 2, 4, and 12, the preferred method 1200 starts at step 1205 when the operating system 36 selects a device to turn on or wake that is currently off or powered down. At step 1210, the operating system 36 commands the ACPI driver 38 to turn on the selected device by putting the device into the appropriate device power state, typically the D0 device power state, so that the selected device is fully operational.

At step 1215, the ACPI driver 38 searches within the HDS 40 to locate a device object representing or identifying the selected device. At step 1220, the ACPI driver 38 identifies which power resources 35a–c from the computer system 5 are needed to support the selected device in the fully on device power state, D0. The ACPI driver 38 finds this information within one of the data objects below the located device object corresponding to the selected device.

At step 1225, the ACPI driver 38 executes a control method listed within the HDS 40 to turn on each of the power resources 35a–c that are identified at step 1220. Once these power resources 35a–c are on, the selected device has the required power, clock source, isolation buffer, and any other power resource 35a–c needed to be fully functional. In the preferred embodiment, the control method is implemented in pseudocode maintained in a control method object that is interpreted by the ACPI driver 38.

Finally, at step 1230, the operating system 36 restores any device context information to the selected device that was previously saved before the preferred method 1200 ends.

Figure 13:
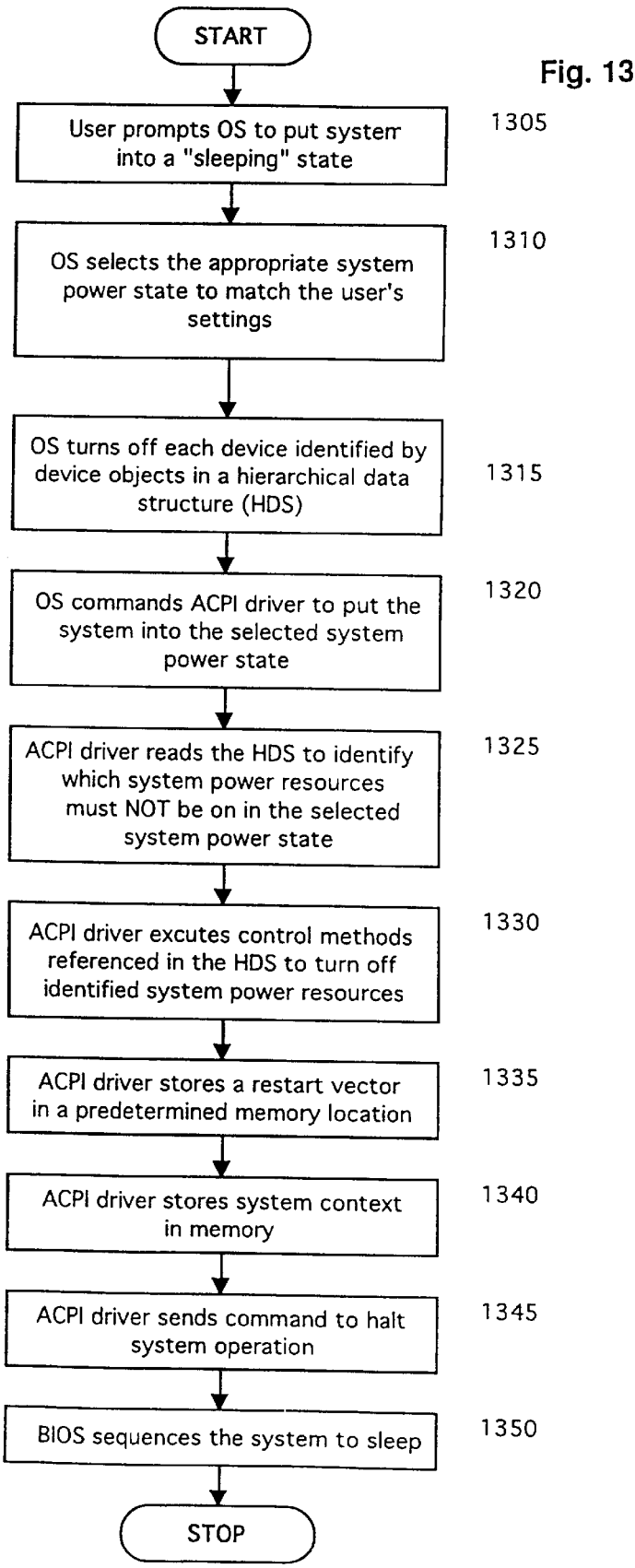
FIG. 13 is a flow diagram illustrating steps of the preferred method for powering down a computer system using a hierarchical data structure.

A hierarchical data structure can also be used to manage the power consumption of a computer system on the system level. FIG. 13 is a flow diagram illustrating steps of the preferred method for powering down a computer system using a hierarchical data structure.

Referring now to FIGS. 1, 2, 4, 11, and 13, the preferred method 1300 starts at step 1305 where the user prompts the operating system 36 to put the computer system 5 into a "sleeping" state. In the preferred embodiment, the prompt from the user can be a time-out that occurs within the computer system 5 after a predetermined time period of non-usage or when the user presses a POWER button on the exterior of the personal computer 10.

At step 1310, the operating system 36 selects the appropriate system power state to match the user's settings. Generally, there are settings on which devices within the computer system 5 are fully functional that allow a user to choose between saving power versus waking up quickly. As previously mentioned, the system power state is described by a special data object preferably maintained with the root level of the HDS 40 containing information on which power resources 35a–c must be off in the selected system power state. In the preferred embodiment, there is one working state of the computer system 5, preferably the S0 state, where the computer system 5 is fully operational and at a high state of power consumption. However, there are different "sleeping" states, preferably S1–S3, of the computer system 5 in the preferred embodiment.

At step 1315, the operating system 36 turns off each of the devices identified within the HDS 40. This step is preferably accomplished by repeating the steps from the preferred method 1200 for turning off a device within a computer system, as discussed above with regards to FIG. 12.

At step 1320, the operating system 36 commands the ACPI driver 38 to put the computer system 5 into the selected system power state. At step 1325, the ACPI driver 38 reads the HDS 40 to identify which power resources 35a–c must be off in the selected system power state. The ACPI driver 38 identifies these power resources 35a–c by reading the information contained in the special data object describing the selected power state of the system.

At step 1330, the ACPI driver 38 executes a control method referenced within the HDS 40 to turn off each of the power resources 35a–c that are identified at step 1325.

Once these identified power resources 35a–c are off, the ACPI driver 38 stores a restart vector in a predetermined memory location at step 1335. In the preferred embodiment, the restart vector is a real-mode Wake vector address used by the BIOS 17 upon waking the system. The BIOS 17 starts executing code starting from this restart vector when waking from a "sleeping" system power state, as is discussed later with regard to FIG. 14. The predetermined memory location is a DWORD memory location within the Fixed ACPI Description Table 225 where the operating system 36 (via the ACPI driver 38) stores the restart vector.

At step 1340, the ACPI driver 38 stores the system context in memory. System context is defined as volatile data in the computer system that must be saved when changing states. In step 1345, the ACPI driver 38 sends a command to halt the operation of the processor 12. In the preferred embodiment, the ACPI driver 38 sends this command by writing a sleep state number to a sleep enable register (SLP_EN) used in power management. Finally, at step 1350, the BIOS 17 sequences the computer system 5 to sleep. At this point, the computer system 5 is in the sleeping (i.e., a low power consumption) state but is capable of being turned back on.

Figure 14:
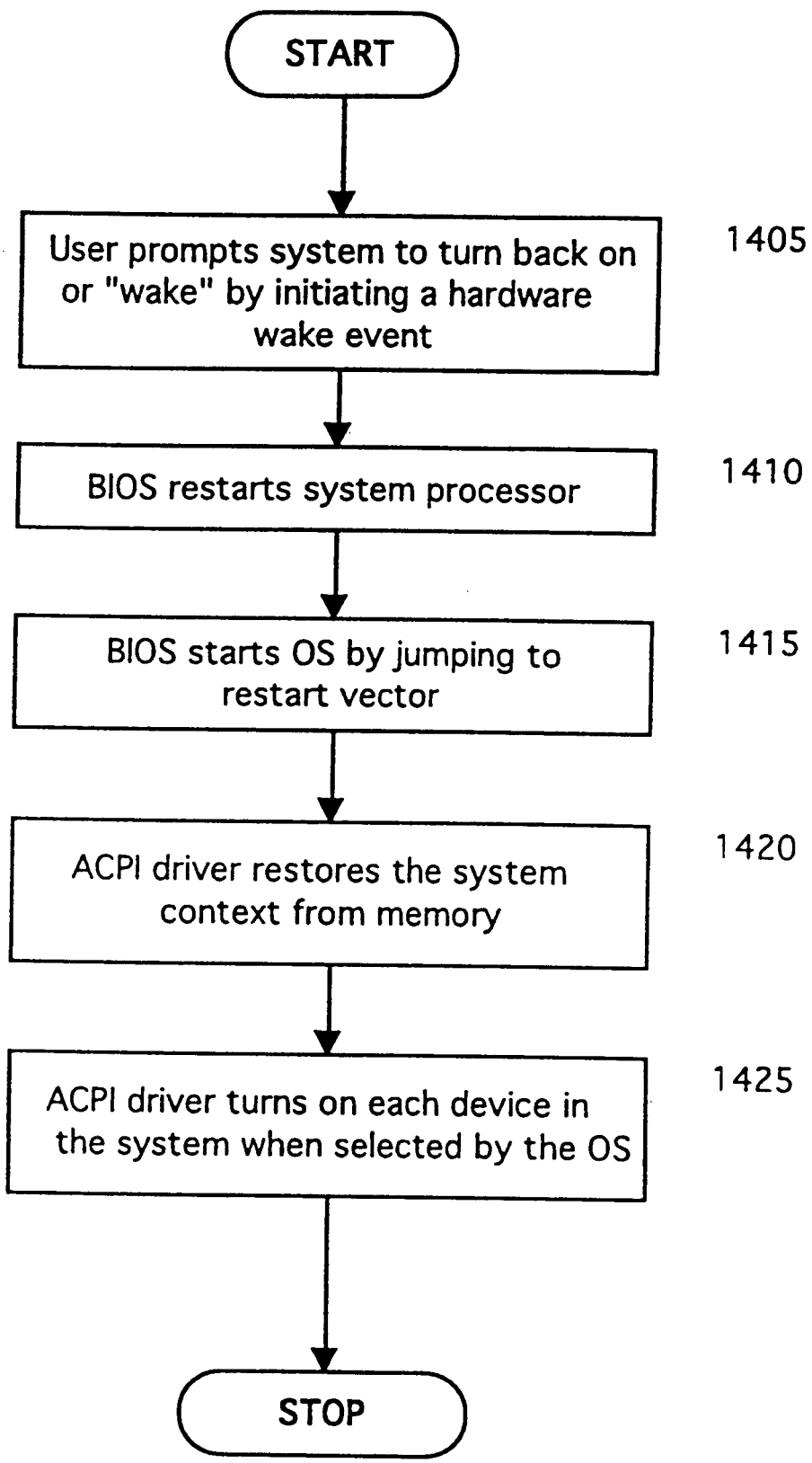
FIG. 14 is a flow diagram illustrating steps of the preferred method for turning on or waking a computer system using a hierarchical data structure.

While the computer system 5 is in the above-mentioned sleeping state, certain devices may have the capacity to wake the computer system, despite the fact that the processor 12 is no longer being powered. FIG. 14 is a flow diagram illustrating steps of the preferred method for turning on or waking a computer system 5 using a hierarchical data structure.

Referring now to FIGS. 1, 2, 4, 12, and 14, the preferred method 1400 starts with step 1405 when the user prompts the computer system 5 to turn back on or "wake" by initiating a hardware wake event. In the preferred embodiment, a hardware wake event is a signal generated by one of the devices 265 in response to a prompting action. For example, the modem 29 may generate a signal in response to an incoming ring on a connected telephone line (not shown). However, a hardware wake event may include other physical or electrical stimulus which notifies the computer system 5 to turn back on.

At step 1410, the processor 12 is restarted by the BIOS 17 in response to the hardware wake event. At step 1415, the BIOS 17 starts the operating system 36 by jumping to the restart vector. In the preferred embodiment, the BIOS 17 first checks the value of the restart vector. If the value of the restart vector is zero, the BIOS 17 adheres to the normal booting process as previously described with regards to FIGS. 3 and 8. However, if the value of the restart vector is not zero, the restart vector is preferably copied by the BIOS 17 before initializing the restart vector back to zero and jumping to the copied address that was listed in the restart vector.

At step 1420, the ACPI driver 38 restores the system context from memory. This restores the volatile data from the computer system 5 that was previously saved when the computer system 5 was put into the sleeping state, as discussed with regards to FIG. 13.

Finally, at step 1425, the ACPI driver 38 turns on each device in the computer system 5 using the HDS 40 when each device is selected by the operating system 36 accordingly to the preferred method 1200 for turning on a device.

In summary, the HDS 40 may used by the operating system 36 for power management (1) to identify the power resources 35a–c needed to support each device in a particular device power state, (2) to identify which power resources 35a–c must not be on to support a particular system power state, and (3) as a listing for executable control methods used to interact with (turn on or off) each of the devices 265 and power resources 35a–c within the computer system 5.

SUMMARY OF THE DETAILED DESCRIPTION

From the foregoing description, it will be appreciated that the present invention provides a system for using a hierarchical data structure to control and identify devices within a computer system and represent connections between the devices. In an embodiment of the present invention, the hierarchical data structure is created in dynamic memory when booting and can be dynamically expanded or modified during run-time operations of the computer system. Information about the devices is loaded from a definition block into the hierarchical data structure. The information is a byte stream of data that is translated and stored as hierarchical information, such as device objects, data objects, and control method objects. These objects are hierarchically nested within the hierarchical data structure. A device object identifies a corresponding device in the computer system. The hierarchy formed between device objects represents the hierarchical I/O connections within the computer system. A data object identifies configuration and hardware dependency information associated with a corresponding device. A control method object is an executable object for controlling a corresponding device. The control method object is a sequence of pseudocode instructions interpreted by the operating system providing an abstract, extensible, and portable mechanism for precise control of a device without calling routines from the BIOS.

The hierarchical data structure is preferably used by the operating system as a communication tool between hardware and software. Futhermore, the hierarchical data structure is used as a reference to identify devices, to identify configuration and power management information about devices, to provide an executable control mechanism that is abstract and extensible to control devices, and to extensibly add functionality to a device.

The foregoing system may be conveniently implemented in a hierarchical data structure that is described in the flow chart in FIG. 6 and a software module using such a hierarchical data structure that embodies the flow charts in FIGS. 7–14. No particular programming language has been required for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. The particular embodiment described is one of an portable personal computer and a docking station running an ACPI-enabled operating system using an ACPI Namespace as the hierarchical data structure. However, those skilled in the art will understand that the principles of the present invention apply to any processes that require identifying devices, controlling devices, or extending the functionality of devices within any type of computer system.

Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented process for creating and using a hierarchical data structure to identify and control a plurality of devices connected to the computer including a first device physically connected to the computer and a second device physically connected to the first device, comprising the steps of:

storing a first device object within the hierarchical data structure, the first device object identifying the first device; and storing a second device object positioned below the first device object within the hierarchical data structure, the second device object identifying the second device;

the relative positions of first and second device objects within the hierarchical data structure representing the physical connection between the first and second devices; and referring to the hierarchical data structure when controlling the first and second devices.

2. The computer-implemented process of claim 1, further comprising the step of storing a first data object positioned below the first device object within the hierarchical data structure, the first data object containing information associated with the first device, the relative positions of the first device object and the first data object within the hierarchical data structure connoting an association between the first device and the first data object.

3. The computer-implemented process of claim 2 wherein the step of referring to the hierarchical data structure when controlling the first and second devices comprises the steps of:

ascertaining the association between the first device and the first data object by identifying the relative positions of first device object and the first data object within the hierarchical data structure;

retrieving the information associated with the first device from the first data object; and using the information retrieved from the first data object to control the first device.

4. The computer-implemented process of claim 3, wherein:

the information contained in the first data object includes information selected from the group consisting essentially of configuration information about the first device, dependency information for the first device, power states for the first device, power resources associated with the first device in each of the power states, and an operational region associated with the first device.

5. The computer-implemented process of claim 3, wherein the information contained in the first data object includes executable pseudocode instructions defining a methodology for accessing controllable elements associated with the first device.

6. The computer-implemented process of claim 1, further comprising the step of storing a first control method object positioned below the first device object within the hierarchical data structure, the first control method object containing instructions for performing system-level hardware tasks associated with the first device, the relative positions of first device object and the first control method object within the hierarchical data structure connoting an association between the first device and the first control method object.

7. The computer-implemented process of claim 6, wherein the step of referring to the hierarchical data structure when controlling the first and second devices comprises the steps of:

ascertaining the association between the first device and the first control method object by identifying the relative positions of first device object and the first control method object within the hierarchical data structure;

retrieving the instructions for performing the system-level hardware tasks associated with the first device from the first control method object; and using the information retrieved from the first control method object to perform one or more of the system-level hardware tasks associated with the first device.

8. The computer-implemented process of claim 7, wherein the information contained in the first control method object includes executable pseudocode instructions for performing the system-level hardware tasks associated with the first device.

9. The computer-implemented process of claim 1, further comprising the steps of:

reading a first byte stream of data from a definition block defining the first device object and the position of the first device object within the hierarchical data structure; and reading a second byte stream of data from the definition block defining the second device object and the position of the second device object within the hierarchical data structure.

10. The computer-implemented process of claim 9, further comprising the steps of:

reading a third byte stream of data from the definition block defining a first data object and a position for the first data object below the first device object within the hierarchical data structure; and storing the first data object below the first device object within the hierarchical data structure as defined by the third bye stream, the first data object containing information associated with the first device, the relative positions of first device object and the first data object within the hierarchical data structure connoting an association between the first device and the first control method object.

11. The computer-implemented process of claim 10, further comprising the steps of:

reading a fourth byte stream of data from the definition block defining a first control method object and a position for the first control method object below the first device object within the hierarchical data structure; and storing the first control method object below the first device object within the hierarchical data structure as defined by the fourth byte stream, the first control method object containing instructions for performing system-level hardware tasks associated with the first device, the relative positions of first device object and the first control method object within the hierarchical data structure connoting an association between the first device and the first control method object.

12. The computer-implemented process of claim 2, further comprising the step of storing a second data object positioned below the second device object within the hierarchical data structure, the second data object containing information associated with the second device, the relative positions of the second device object and the second data object within the hierarchical data structure connoting an association between the second device and the second data object.

13. The computer-implemented process of claim 12, further comprising the steps of:

ascertaining the association between the second device and the second data object by identifying the relative positions of the second device object and the second data object within the hierarchical data structure;

retrieving the information associated with the second device from the second data object; and using the information retrieved from the second data object to control the second device.

14. The computer-implemented process of claim 6, further comprising the step of storing a second control method object positioned below the second device object within the hierarchical data structure, the second control method object containing instructions for performing system-level hardware tasks associated with the second device, the relative positions of the second device object and the second control method object within the hierarchical data structure connoting an association between the second device and the second control method object.

15. The computer-implemented process of claim 14, further comprising the steps of:

ascertaining the association between the second device and the second control method object by identifying the relative positions of the second device object and the second control method object within the hierarchical data structure;

retrieving the instructions for performing the system-level hardware tasks associated with the second device from the second control method object; and using the information retrieved from the second control method object to perform one or more of the system-level hardware tasks associated with the second device.

16. The computer-implemented process of claim 1, wherein the step of storing the second device object comprises the steps of:

sensing whether the second device is connected to the first device while the computer system is running; and if the second device is connected to the first device, storing the second device object below the first device object within the hierarchical data structure.

17. The computer-implemented process of claim 1 further comprising the steps of:

sensing that the second device has been removed from connection with the computer; and in response to sensing that the second device has been removed from connection with the computer:

removing the second device object from the hierarchical data structure; and removing an affected object from the hierarchical data structure, the affected object being defined as an object positioned within the hierarchy below the second device to connote an association between the second device object and the affected object.

18. The computer-implemented process of claim 1, further comprising the steps of:

sensing that the second device has been removed from connection with the computer system; and in response to sensing that the second device has been removed from connection with the computer:

setting a first status attribute associated with the second device object, and setting a second status attribute associated with an affected object, the affected object defined as an object positioned within the hierarchy below the second device to connote an association between the second device object and the affected object.

19. A computer system for dynamically expanding a hierarchical data structure, comprising:

a processor;

a plurality of controllable devices functionally connected to the processor, the plurality of controllable devices comprising:

a first device physically connected to the processor, and a second device physically connected to the first device;

a memory storage device connected to the processor and storing the hierarchical data structure including a first device object identifying the first device and a second device object positioned below the first device object, the second device object identifying the second device and the relative positions of first and second device objects within the hierarchical data structure representing the physical connection between the first and second devices; and the processor being operative to:

interrogate the first device in response to a hardware event affecting the first device, sense the second device is connected to the first device, search the hierarchical data structure for the second device object, obtain hierarchical information about the second device if the processor fails to locate the one of the hierarchically related objects that identifies the underlying device, and store the hierarchical information about the second device at an insert location within the hierarchical data structure.

20. The computer system of claim 19, wherein the insert location within the hierarchical data structure is referenced relative to one of the hierarchically related objects existing within the hierarchical data structure.

21. The computer system of claim 19, wherein the insert location within the hierarchical data structure is referenced absolutely from a root level within the hierarchical data structure.

22. The computer system of claim 19, wherein the hierarchical information about the underlying device comprises one or more additional hierarchically related objects associated with the second device.

23. A computer system for dynamically modifying a hierarchical data structure having a plurality of hierarchically related objects that identify a plurality of controllable devices within the computer system, comprising:

a processor;

the plurality of controllable devices connected to the processor;

a memory storage device connected to the processor for storing the hierarchical data structure; and the processor being operative to:

sense a request to remove one of the controllable devices from the computer system, determine which of the controllable devices in the computer system are affected if the requested device is removed, set a first status attribute of any of the hierarchically related objects within the hierarchical data structure associated with the requested device, the first status attribute indicating that the requested device is not present within the computer system; and set a second status attribute of any of the hierarchically related objects within the hierarchical data structure associated with the affected devices, the second status attribute indicating that the affected devices are not present within the computer system.

24. The method of claim 23, wherein the processor is further operative to:
   search dependency information corresponding to each of the devices identified within the hierarchical data structure; and
   identify which of the controllable devices depend upon the requested device, the identified devices being the affected devices.

25. The method of claim 24, wherein the affected devices are represented by corresponding hierarchically related objects within the hierarchical data structure below the one of the hierarchically related objects associated with the requested device.

26. A computer-readable medium on which is stored a computer program for controlling a device within a computer system using a hierarchical data structure, the computer program comprising instructions, which when executed by a computer, perform the steps of:
   receiving a request to control the device in a desired manner, the device having a controllable element;
   identifying a first control method within the hierarchical data structure corresponding to the request, the first control method being a sequence of one or more pseudocode instructions;
   executing the first control method by sequentially calling each of the pseudocode instructions; and
   accessing a representation of the controllable element of the device in response to the executing step, wherein accessing the representation of the controllable element provides control of the device.

27. The computer-readable medium of claim 26, wherein the representation of the controllable element is an operational region associated with the device, the operation region providing an abstract representation of the controllable element of the device, wherein accessing the operational region provides indirect control of the device.

28. The computer-readable medium of claim 27, wherein the operational region is further defined as an abstract data object with a predetermined bit width corresponding to one or more bits of the controllable element.

29. The computer-readable medium of claim 26, wherein the pseudocode instructions correspond to object references, each object referenced performs a precise system function on the device.

30. The computer-readable medium of claim 26, wherein the first control method is contained in a control method object in the hierarchical data structure, and the control method object is associated with the device.

31. The computer-readable medium of claim 26, wherein the first control method includes a reference to a second control method contained in the hierarchical data structure.

32. A computer system for using a hierarchical data structure to provide enhanced functionality of a controllable device in the computer system, comprising:
   a processor;
   the controllable device coupled to the processor;
   a memory storage device coupled to the processor for storing the hierarchical data structure; and
   the processor being operative to:
      identify the controllable device by reading the hierarchical data structure containing a device object, the device object corresponding to the controllable device,
      load a device driver into memory from the memory storage device for supporting the device object,
      determine if the controllable device supports additional functionality beyond the functionality supported by the device driver, and
      create a new device object associated with the device driver if the controllable device supports the additional functionality, wherein the new device object, in response to a call to the device driver, references the hierarchical data structure to provide the additional functionality for the controllable device.

33. The computer system of claim 32, wherein processor is further operative to search within the hierarchical data structure for a data object associated with the controllable device in order to determine if the controllable device supports the additional functionality, the data object containing configuration information about the controllable device.

34. The computer system of claim 32, wherein the processor is further operative to search within the hierarchical data structure for a control method object associated with the controllable device in order to determine if the controllable device supports the additional functionality, the control method object providing an executable reference for controlling the controllable device.

35. A method for using a hierarchical data structure to power down one of a plurality of controllable devices within a computer system having a plurality of power resources, comprising the steps of:
   (a) selecting one of the controllable devices to power down;
   (b) identifying the power resources that must be on to support the selected device when powered down by reading one of a plurality of hierarchically related objects within the hierarchical data structure below a device object within the hierarchical data structure, the device object being one of the hierarchically related objects and associated with the selected device; and
   (c) turning off all of the power resources that are not one of the identified power resources.

36. The method of claim 35, wherein the step (c) comprises the steps of:
   (d) executing a first control method to turn off one of the power resources that is not one of the identified power resources, the first control method being referenced by a first control method object within the hierarchical data structure, the first control method object providing an executable mechanism for controlling the one of the power resources; and
   (e) repeating step (d) for each of the power resources that is not one of the identified power resources.

37. The method of claim 35 further comprising the step of (f) turning on all of the identified power resources.

38. The method of claim 37, wherein the step (f) comprises the steps of:
   (g) executing a second control method to turn on one of the identified power resources, the second control method being referenced by a second control method object within the hierarchical data structure, the second control method object providing an executable mechanism for controlling the one of the identified power resources; and
   (h) repeating step (g) for each of the identified power resources.

39. The method of claim 35 further comprising the steps:
   (i) selecting a sleeping system power state prior to step (a);
   (j) repeating steps (a)–(c) for each of the controllable devices within the computer system;

(k) identifying the power resources that must be off to support the selected system power state by reading the hierarchical data structure; and (m) turning off all of the selected power resources.

40. The method of claim 39, wherein the step (m) comprises the steps of:

(n) executing a first control method to turn off one of the power resources that is one of the identified power resources, the first control method being referenced by a first control method object within the hierarchical data structure, the first control method object providing an executable mechanism for controlling the one of the power resources; and (p) repeating step (n) for each of the identified power resources.

41. A method for using a hierarchical data structure to turn on one of a plurality of controllable devices within a computer system having a plurality of power resources, comprising the steps of:

(a) selecting one of the controllable devices to turn on;

(b) identifying the power resources that must be on to support the selected device by reading one of a plurality of hierarchically related objects within the hierarchical data structure below a device object within the hierarchical data structure, the device object being one of the hierarchically related objects and associated with the selected device; and (c) turning on all of the identified power resources.

42. The method of claim 41, wherein the step (c) comprises the steps of:

(d) executing a control method to turn on one of the identified power resources, the control method being referenced by a control method object within the hierarchical data structure, the control method object providing an executable mechanism for controlling the state of the one of the identified power resources; and (e) repeating step (d) for each of the identified power resources.

43. The method of claim 41 further comprising the steps of:

prior to steps (a)–(c), prompting the computer system to turn on, restarting a processing unit within the computer system, and jumping to a restart vector in memory; and in response to step (c), repeating steps (a)–(c) for one of the rest of the devices within the computer system.

44. The method of claim 43, wherein the prompting step is further defined as initiating a hardware wake event.

* * * * *